United States Patent
Vembu et al.

(10) Patent No.: US 9,817,770 B2
(45) Date of Patent: Nov. 14, 2017

(54) MEMORY ADDRESS RE-MAPPING OF GRAPHICS DATA

(71) Applicant: Intel Corporation, Santa Clara, CA (US)

(72) Inventors: Balaji Vembu, Folsom, CA (US);
Aditya Navale, Folsom, CA (US);
Wishwesh Gandhi, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/963,518

(22) Filed: Dec. 9, 2015

(65) Prior Publication Data

US 2016/0147668 A1 May 26, 2016

Related U.S. Application Data

(60) Continuation of application No. 13/932,963, filed on Jul. 1, 2013, now Pat. No. 9,223,603, which is a
(Continued)

(51) Int. Cl.
*G06F 12/10* (2016.01)
*G06F 12/1009* (2016.01)
(Continued)

(52) U.S. Cl.
CPC ........ *G06F 12/1009* (2013.01); *G06F 9/4401* (2013.01); *G06F 9/4403* (2013.01);
(Continued)

(58) Field of Classification Search
CPC .............. G06F 12/109; G06F 12/1009; G06F 2009/45583; G06F 9/45533;
(Continued)

(56) References Cited

U.S. PATENT DOCUMENTS 5,077,654 A 12/1991 Ohtsuki
5,088,031 A 2/1992 Takasaki et al.
(Continued)

FOREIGN PATENT DOCUMENTS

EP 0067344 A2 12/1982
EP 1677190 A2 7/2006
MX PA05012972 A 6/2006

OTHER PUBLICATIONS

Advisory Action from U.S. Appl. No. 12/912,630 dated Oct. 28, 2011, 3 pages.
(Continued)

*Primary Examiner* — Hau Nguyen
(74) *Attorney, Agent, or Firm* — Nicholson De Vos Webster & Elliott LLP

(57) ABSTRACT

A method and apparatus for creating, updating, and using guest physical address (GPA) to host physical address (HPA) shadow translation tables for translating GPAs of graphics data direct memory access (DMA) requests of a computing environment implementing a virtual machine monitor to support virtual machines. The requests may be sent through a render or display path of the computing environment from one or more virtual machines, transparently with respect to the virtual machine monitor. The creating, updating, and using may be performed by a memory controller detecting entries sent to existing global and page directory tables, forking off shadow table entries from the detected entries, and translating GPAs to HPAs for the shadow table entries.

4 Claims, 15 Drawing Sheets

Related U.S. Application Data continuation of application No. 13/369,720, filed on Feb. 9, 2012, now Pat. No. 8,477,145, which is a division of application No. 12/912,630, filed on Oct. 26, 2010, now Pat. No. 8,154,555, which is a continuation of application No. 11/480,663, filed on Jun. 30, 2006, now Pat. No. 7,868,897.

(51) Int. Cl.

| | | |
|---|---|---|
| *G06F 9/44* | (2006.01) | |
| *G06F 12/109* | (2016.01) | |
| *G06F 13/28* | (2006.01) | |
| *G06T 1/60* | (2006.01) | |
| *G06F 9/455* | (2006.01) | |

(52) U.S. Cl.
CPC ........ *G06F 9/4411* (2013.01); *G06F 9/45533* (2013.01); *G06F 9/45558* (2013.01); *G06F 12/109* (2013.01); *G06F 13/28* (2013.01); *G06T 1/60* (2013.01); *G06F 2009/45579* (2013.01); *G06F 2009/45583* (2013.01); *G06F 2212/152* (2013.01)

(58) Field of Classification Search
CPC ............... G06F 2212/152; G06F 12/10; G06F 12/0292; G06F 2212/657; G06F 9/4555; G06T 1/60

See application file for complete search history.

(56) References Cited

U.S. PATENT DOCUMENTS

| | | | |
|---|---|---|---|
| 5,390,309 A | 2/1995 | Onodera | |
| 5,426,748 A | 6/1995 | Brenza et al. | |
| 6,895,491 B2 | 5/2005 | Kjos et al. | |
| 6,907,600 B2 | 6/2005 | Neiger et al. | |
| 7,111,145 B1 | 9/2006 | Chen et al. | |
| 7,499,057 B2 | 3/2009 | Wooten | |
| 2005/0132365 A1 | 6/2005 | Madukkarumukumana et al. | |
| 2006/0146057 A1 | 7/2006 | Blythe | |
| 2006/0206687 A1* | 9/2006 | Vega .................. G06F 12/10 711/206 | |
| 2006/0259734 A1* | 11/2006 | Sheu .................. G06F 12/1036 711/203 | |
| 2007/0057957 A1* | 3/2007 | Wooten ............... G06F 12/1009 345/566 | |

OTHER PUBLICATIONS

European search report for application No. EP20070784526, dated Jun. 5, 2009, 6pages.
Final Office Action from U.S. Appl. No. 11/480,663 dated Jul. 20, 2010, 10 pages.
Final Office Action from U.S. Appl. No. 12/912,630 dated Aug. 23, 2011, 8 pages.
Final Office Action from U.S. Appl. No. 13/369,720 dated Nov. 14, 2012, 10 pages.
Final Office Action from U.S. Appl. No. 13/932,963 dated Aug. 10, 2015, 10 pages.
Intel Corporation, Transmittal of International Search Report and Written Opinion dated Nov. 13, 2007, PCT/US2007/071953 filed Jun. 22, 2007.
International Preliminary Report for Patentability for Application No. PCT/US2007/071953 dated Jan. 6, 2009, 5 pages.
Non-Final Office Action from U.S. Appl. No. 11/480,663 dated Aug. 18, 2009, 11 pages.
Non-Final Office Action from U.S. Appl. No. 11/480,663 dated Jan. 28, 2010, 10 pages.
Non-Final Office Action from U.S. Appl. No. 11/480,663 dated May 12, 2009, 6 pages.
Non-Final Office Action from U.S. Appl. No. 12/912,630 dated Feb. 17, 2011, 9 pages.
Non-Final Office Action from U.S. Appl. No. 13/369,720 dated Apr. 10, 2012, 11 pages.
Non-Final Office Action from U.S. Appl. No. 13/369,720 dated Sep. 7, 2012, 8 pages.
Non-Final Office Action from U.S. Appl. No. 13/932,963 dated Mar. 2, 2015, 11 pages.
Notice of Allowance from U.S. Appl. No. 11/480,663 dated Sep. 3, 2010, 6 pages.
Notice of Allowance from U.S. Appl. No. 12/912,630 dated Dec. 5, 2011, 5 pages.
Notice of Allowance from U.S. Appl. No. 13/369,720 dated Mar. 1, 2013, 7 pages.
Notice of Allowance from U.S. Appl. No. 13/932,963 dated Sep. 2, 2015, 6 pages.
Invitation Pursuant to Article 94(3) and Rule 71(1) EPC for foreign counterpart European Application No. 07784526.1, dated May 18, 2011, 3 pages.
Communication pursuant to Article 94(3) EPC for foreign counterpart European Application No. 07784526.1, dated Aug. 18, 2009, 8 pages.
Decision to grant a European patent pursuant to Article 97(1) EPC for foreign counterpart European Application No. 07784526.1, dated Feb. 16, 2012, 2 pages.
Notice of Preliminary Rejection for foreign counterpart Korea Application No. 10-2008-7030723, dated Apr. 30, 2010, 4 pages.
Grant of Patent for foreign counterpart Korea Application No. 10-2008-7030723, dated Nov. 29, 2010, 3 pages.
First Office Action for foreign counterpart China Application No. 200780024810.9, dated Nov. 9, 2010, 7 pages.
Second Office Action for foreign counterpart China Application No. 200780024810.9, dated Aug. 17, 2011, 7 pages.
Third Office Action for foreign counterpart China Application No. 200780024810.9, dated May 21, 2012, 8 pages.
Grant Patent for foreign counterpart China Application No. 200780024810.9, dated Sep. 29, 2012, 1 page.

\* cited by examiner

MEMORY ADDRESS RE-MAPPING OF GRAPHICS DATA

CROSS REFERENCE TO RELATED APPLICATIONS

This application is a continuation of U.S. patent application Ser. No. 13/932,963, filed Jul. 1, 2013, which is a continuation of U.S. patent application Ser. No. 13/369,720, filed Feb. 9, 2012 issued as U.S. Pat. No. 8,477,145 on Jul. 2, 2013, which is a divisional of U.S. patent application Ser. No. 12/912,630, filed Oct. 26, 2010 issued as U.S. Pat. No. 8,154,555 on Apr. 10, 2012, which is a continuation of U.S. patent application Ser. No. 11/480,663, filed Jun. 30, 2006, entitled AN APPARATUS AND METHOD FOR MEMORY ADDRESS RE-MAPPING OF GRAPHICS DATA issued as U.S. Pat. No. 7,868,897 on Jan. 11, 2011.

BACKGROUND

A virtual machine architecture logically partitions a physical machine, such that the underlying hardware of the machine is time-shared and appears as one or more independently operating virtual machines (VMs). A virtual machine monitor (VMM) runs on a computer to facilitate for other software the abstraction of one or more VMs. Each VM may function as a self-contained platform, running its own operating system (OS) and application software. The software running in a VM is collectively referred to herein as "guest software."

A VMM environment provides hardware and system-control instructions that enable software running on an actual system to provide an almost-perfect emulation of a virtual system or VM for guest software. Benefits of such environments include, for example, the ability to run multiple operating systems on a single physical machine; improved utilization of CPU and hardware resources.

Virtualization technology allows a platform to support running of multiple partitions over a single machine or computing system (or environment). These partitions are isolated from each other, providing the advantage of increased robustness. The partitions run on top of a VMM, which may be described as a software virtualization layer that has a "real view" of the platform resources, such as the memory. Thus, this real view of memory may be described as the "host physical addresses" or HPAs (e.g., host addresses). Each partition or VM has a "virtualized view" of memory, which may be described as "guest physical addresses" or GPAs.

The guest software expects to operate as if it were running on a dedicated computer rather than in a VM. That is, the guest software expects to control various events and have access to hardware resources on the computer (e.g., physical machine). The hardware resources of the physical machine may include one or more processors, resources resident on the processors (e.g., control registers, caches and others), memory (e.g., instructions and/or data residing in memory at addresses, such as graphics instructions and/or data), graphics devices and/or controllers (e.g., graphics circuits, graphics chipsets, graphics cards, etc.), and other resources (e.g., input/output devices) that reside in the physical machine. The events may include rendering and displaying graphics data to display graphics images in a VMM environment. Such images can include pixel images, encoded images, video images or frames, static images, photo images, animated images, movies, etc.

Hence, a VMM presents to other software ("guest software," "guests" or simply "guest") the abstraction of one or more VMs. The VMM can provide the same or different abstractions to the various guests. Each guest expects the full facilities of the hardware platform presented in the VM to be available for its use. For example, the guest expects to have access to all registers, caches, structures, I/O devices, memory, graphics devices/controllers and the like according to the architecture of the processor and platform presented in the VM. Further, each guest may expect the VMM to handle various events, such as by handling a guest's graphics instructions (e.g., including graphics addresses) and/or data to display graphics images on a display or monitor.

For instance, in some cases a VMM may depend on virtualization of devices for input/output (IO) device support. Typically, the IO devices are virtualized by the VMM and the VMM directly controls the actual hardware on the platform. In these cases the VMM emulates the IO devices that are exposed to the VM. Since the VMM directly communicates with the hardware, the VMM carries the drivers for all of the devices supported. Carrying all of the drivers causes the VMM code or software to bloat or have an undesirably large amount of code leading to increased complexity.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1A:
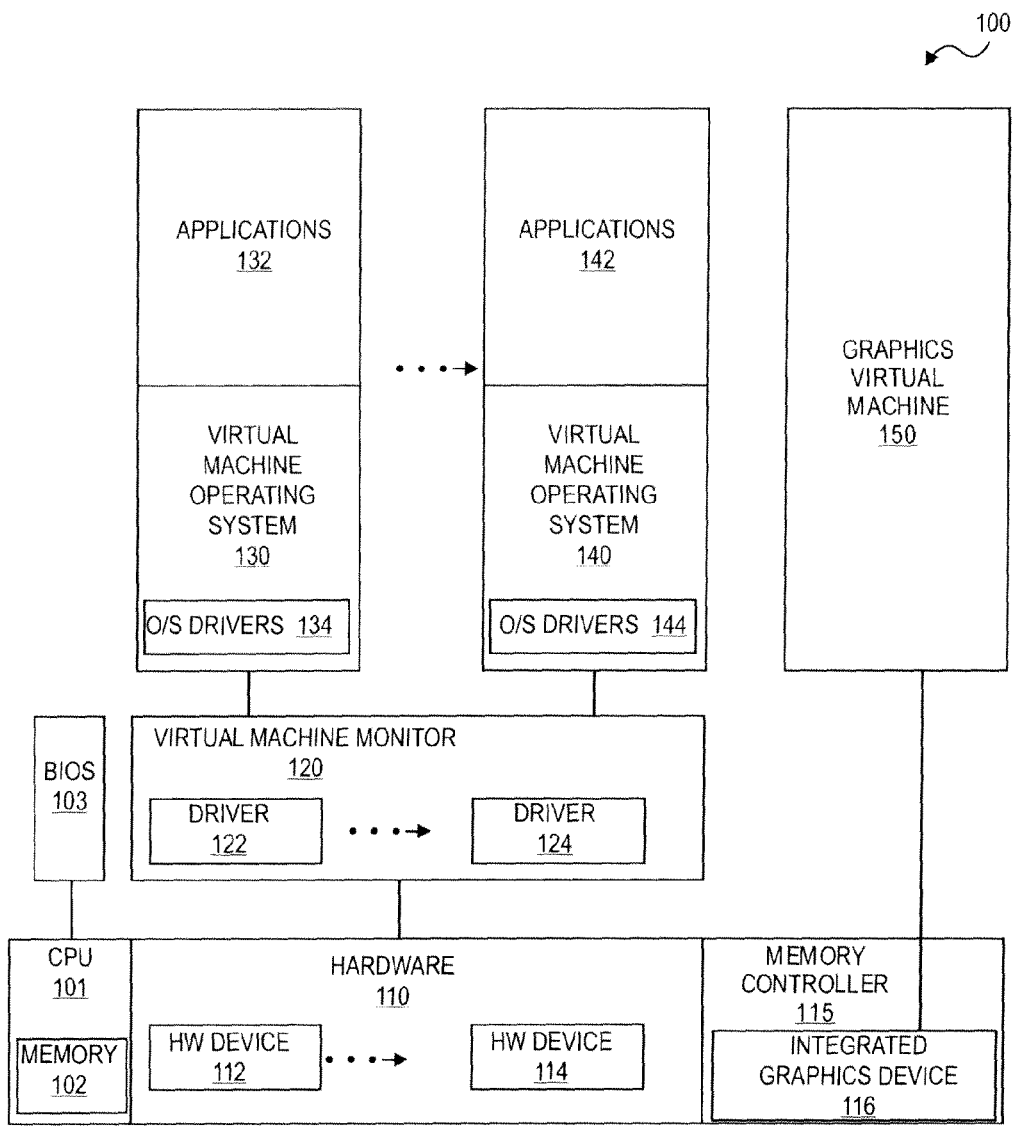
FIG. 1A is a block diagram illustrating an integrated graphics render path in a virtualized environment, in accordance with one embodiment.

One or more embodiments of the invention relate generally to computer system design. More particularly, one or more of the embodiments relate to a method and apparatus for rendering and displaying graphics data to display graphics images in a virtualized environment. For instance, as noted above, in cases where a VMM emulates the IO devices that are exposed to VMs, and VMM carries the drivers for all of the devices supported, carrying all of the drivers may causes the VMM code or software to bloat or have an undesirably large amount of code leading to increased complexity. Intel Corp. (Intel Corporation of Santa Clara, Calif.) has developed virtualization technology for directed input/output (IO) architecture that provides the support to allow guest VMs to directly drive IO devices, thus eliminating drivers from the VMM (e.g., see Intel's VT-d technology—*Intel® Virtualization Technology for Directed I/O Architecture Specification*, Intel Corporation, published February 2006, Order Number: D51397-001).

Consequently, descriptions herein include methods and apparatus for displaying graphics images of multiple guest applications running on multiple virtual machines, according to each guest application's graphics instructions (e.g., including graphics addresses) and data. For instance, a graphics virtual machine (VM) (which may include a VM operating system and other applications, such as other graphics applications running in the graphics VM), graphics controllers and/or graphics devices may be used to handle various application program graphics needs, such as by handling a guest's graphics instructions and/or data to display graphics images on a display. Handling a guest's graphics instructions and/or data may include accessing the graphics instructions and/or data, such as by writing the graphics instructions and/or data to physical addresses in a memory (e.g., the physical address corresponds to a graphics addresses from a guest application) and reading the graphics instructions and/or data from physical addresses of a memory.

In the following description, numerous specific details such virtual machine monitor (VMM) environment implementations, sizes and names of signals and buses, types and interrelationships of system components, hardware, processors, circuitry, devices, graphics devices, graphics controllers, memories, operating systems, VMs, and logic partitioning/integration choices are set forth to provide a more thorough understanding. It will be appreciated, however, by one skilled in the art that the invention may be practiced without such specific details. In other instances, control structures and gate level circuits (e.g., circuitry) have not been shown in detail to avoid obscuring the invention. Those of ordinary skill in the art, with the included descriptions, will be able to implement appropriate logic circuits without undue experimentation.

In the following description, certain terminology is used to describe features of the invention. For example, the terms "device", "chip", "chipset" and/or "circuitry" may be representative of hardware, an application program to be executed by a processor, a computer operating system, machine readable medium containing instructions to be executed by a processor, and/or software configured to perform one or more functions. For instance, examples of "devices", "controllers", "a chip", "a chipset" and/or "circuitry" may include, but are not limited or restricted to, electronic hardware, logic circuitry, processors, memory, an integrated circuit, a chip, a chipset, a "card", a printed circuit board having electronics hardware and/or software thereon, firmware, a finite state machine or even combinatorial logic. The integrated circuit may take the form of a processor such as a microprocessor, application specific integrated circuit, a digital signal processor, a micro-controller, or the like. In some cases, a circuit, a graphics device, a graphics controller, and/or a chipset as described herein, may be or may include graphics circuits, graphics chipsets, graphics cards, graphics memory, graphics VMs, graphics VM operating systems, an integrated graphics device, a discrete graphics controller, render engines, display engines, etc. Also, in some cases herein, the term "graphics data" may be used to describe graphics instructions and data.

Moreover, accessing, receiving, detecting, sensing or otherwise knowing of an entry into a table may include hardware and/or software sensing that entry prior to, during or after attempted entry into the table, including when the entry is not actually stored in the table. In some cases translating, converting, building, or creating one address considering another address (e.g., translating or converting a graphics address (e.g., the virtual address included in an instruction or request from a guest application) to a GPA or to a host physical address (HPA)) may represent the same or related processes, apparatus, and/or systems. For example, a GPA or HPA may be created, translated, converted, or built from a graphics address according to a relationship (e.g., memory address conversion) between the GPA or HPA and the graphics address.

FIG. 1A is a block diagram illustrating an integrated graphics render path in a virtualized environment, in accordance with one embodiment. FIG. 1A shows a VMM environment 100 including virtual machine monitor (VMM) 120 coupled to or between virtual machine operating system 130, virtual machine operating system 140 and hardware 110. FIG. 1A also shows graphics VM 150 (which may include a VM operating system and other applications, such as other graphics applications running in the graphics VM), coupled to graphics device 116 of memory controller 115, of hardware 110. The graphics (or "Gfx") VM 150 may directly drive the Gfx device 116 using the mechanisms provided by Intel's virtualization technology for directed IO (e.g., using Intel's VT-d technology). Device 116 may perform functions of a graphics controller (e.g., see controller 118 of FIGS. 1B and 6B). Environment 100 may be, for example, embodied in a desktop computer, a laptop computer, a hand held computing device, a personal computer (PC), work station, a computer server, a networked computer, an electronic device, a computational device, or the like. Also, memory controller 115 or another memory controller (MC) described herein may be in (or on) the same chip, or a different chip as the processor of the environment or computer (e.g., CPU 101). In some cases, a memory controller may be in (or on) a chip or chipset that does not include the processor.

An integrated graphics path may be a path capable of accessing the graphics data by issuing direct memory access (DMA) requests with guest physical address (GPA) and having a memory controller translate the GPAs to host physical addresses (HPAs) or physical memory addresses of a main memory without accessing a VMM. For instance, device 116 and/or memory controller 115 may "independently" translate GPAs of a direct memory access (DMA) requests from operating system 130 and/or 140 into HPAs for directly accessing graphics data from physical addresses of a memory (e.g., HPAs 362 of memory 360, as described for FIG. 2), without using or accessing graphics VM 150 and/or without accessing VMM 120 (e.g., such as without sending the request to a graphic drivers in the VMM or otherwise accessing VMM 120 for graphics driver functionality, while systems 130 and 140 access graphics controller 116 through VMM 120). Thus, graphics VM 150 may communicate with graphics controller 116 to satisfy the graphics needs of system 130 and system 140, without requiring graphics drivers in VMM 120. An integrated part may include one or more integrated graphics devices, such as integrated graphics device 116 integrated with or as part of memory controller 115. MC 115 may include or be described as memory controller device circuitry, and may be described further below at FIG. 6A.

Hardware 110 includes hardware device 112 and one or more additional hardware devices, such as hardware device 114. Hardware 110 also includes central processing unit (CPU) 101 and memory 102. CPU 101 is coupled to basic input/output systems (BIOS) 103.

VMM 120 includes driver 122 and one or more other drivers such as driver 124 for devices that it directly drives and/or controls. System 130 includes operating system drivers 134 and may run one or more applications, such as applications 132. Likewise, system 140 includes operating system drivers 144 and may run one or more applications, such as applications 142.

CPU 101 may be a processor, such as a processor capable of performing the necessary processing to support VMM 120 and various virtual machines running on VMM 120, as well as graphics VM 150. CPU 101 may be the central processing units (CPUs) of environment 100 and, thus, control and coordinate the overall operation of the environment. In certain embodiments, CPU 101 accomplishes this by executing software, such as operating systems stored in memory 102. A processor of CPU 101 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Likewise, memory 102 may store instructions and/or data to be operated on, translated, detected, sensed, received and/or accessed by CPU 101, graphics VM 150, device 116, and/or controller 115 such as by storing the instructions and/or data at addresses of memory 102 (e.g., addresses addressed using HPAs). Memory 102 may be or include the "main memory" of environment 100. Memory 102 represents any form of random access memory (RAM), read-only memory (ROM), flash memory, the like, or a combination of such devices. Memory 102 may include various types of memory, such as RAM, dynamic RAM (DRAM), standard dynamic RAM (SDRAM), double data rate RAM "DDRRAM", and double data rate version 2 RAM, "DDR2RAM". For instance, memory 102 may be one or more banks of memory chips, integrated circuits, types of RAM, etc. as known in the art. CPU 101 may have direct access to main memory 102 via an address and data bus. Hardware 110 and devices 112-114 may represent physical devices that may be installed in environment 100, such as a keyboard, mass storage controllers, network interfaces, a mouse, sound cards, etc. BIOS 103 may represent software instructions that may be stored, for example, in memory 102 or in a separate, non-volatile memory (not shown).

Graphics device 116 may be an integrated graphics device (e.g., such as a device that is integrated with the memory controller, such as MC 115, and performs graphics display functions). Also, integrated graphics may describe a system or device without or excluding "glue logic", Input/Output interfaces, and/or a bus between MC 115 and device 116. In some cases device 116 may cost less and/or include less electronic circuitry or hardware than a discrete graphics controller (e.g., as compared to controller 118 of FIGS. 1B and 6B).

In most embodiments, host hardware physical memory addresses or physical addresses in memory (e.g., see addresses 362 of FIG. 2) need to be used to access graphics data in a main memory, when using direct memory access (DMA). This reading or writing may be described as accessing memory and/or detecting entries to be made to memory (e.g., such as to write data to and read data from physical addresses of a memory), and may be in accordance with or caused by an application of applications 132 (e.g., an application in a virtual machine). In most virtualized environments, the addresses in the DMA request issued by a device will be graphics addresses that are translated to GPA's by the Gfx address remapping tables (e.g., by a GTT or a Graphics Address Re-Mapping Table (GART)), however, for the DMA request to be satisfied, by device 116 (or controller 118 of FIGS. 1B and 6B), those GPA's must be translated to HPA's.

BIOS software (e.g., BIOS 103) controls a computer system (e.g., environment 100, such as via CPU 101) when it is first powered on (or after a reset operation), such as during a system boot-up or initialization process from a shut down state, before volatile memory structures have been tested and configured. Thus, the BIOS can reserve "hidden" or "stolen" portions of memory 102 for storage of translation tables (e.g., shadow tables) as described herein during a boot-up sequence.

BIOS software may be stored in non-volatile memory or as firmware. Firmware refers to processor routines (e.g., software) that are stored in non-volatile memory structures, such as read only memories (ROMs), flash memories, and the like. These memory structures preserve the code stored in them even when power is shut off. Even though firmware is stored in non-volatile memory, firmware may be copied or shadowed to volatile memory.

Applications 132 represent programs that may be loaded and/or executed under control of system 130. The OS and drivers 134 interface with the virtual platform presented by the VMM. In some cases, drivers 134 may be operating system graphics drivers to which VMM 120 represents or presents a virtual machine, such as a machine including a CPU, memory and hardware, including graphics devices and hardware, that although virtual allow system 130 to operate as if they were an actual non-virtual system (e.g., such as a physical system).

Similarly applications 142 represent programs that may be loaded and/or executed under control of system 140. Instructions and data for applications 132 and 142 may be stored in memory 102 (e.g., such as at physical address of memory 102).

Operating system 130 and/or 140 may include or may be a conventional OS, such as disk operating system (DOS), Windows, Unix, Linux, OS/2, OS/9, Xenx, etc. as known in the art. For instance, operating system may include an operating system such as WINDOWS XP®, or another WINDOWS® operating system by Microsoft Corporation of Redmond, Wash. Operating system 130 and/or 140 may also include a MACINTOSH® operating system by Apple Computer of Cupertino, Calif.

Also, a graphics VM, operating system (e.g., graphics VM 150) and/or graphics devices each may include or may be a set of one or more software programs which control devices and processes of FIGS. 1-14, such as by controlling the operation and the allocation of resources. Application programs 132, or 142 may be a set of one or more software programs having graphics, graphics object, images, graphics frames, and/or video to be displayed to a user.

VMM 120 is a virtual machine monitor that emulates a computer system; as shown, it presents an interface similar to the real system hardware to software running under its control. VMM 120 may logically partition a physical machine, such that the underlying hardware 110 of the machine is time-shared and appears as one or more independently operating virtual machines (e.g., system 130 and 140). VMM 120 may create the VM environment and run on a computer to facilitate, for other software, the abstraction of one or more VMs. Each VM may function as a self-contained platform, running its own operating system (OS) and application software. The software running in a VM is collectively referred to herein as "guest software." For instance VMM 120 may present an interface such as to represent one or more incidence of CPU 101, memory 102, hardware 110 or devices similar thereto. Software running inside a VM is often called "guest" software.

Figure 6A:
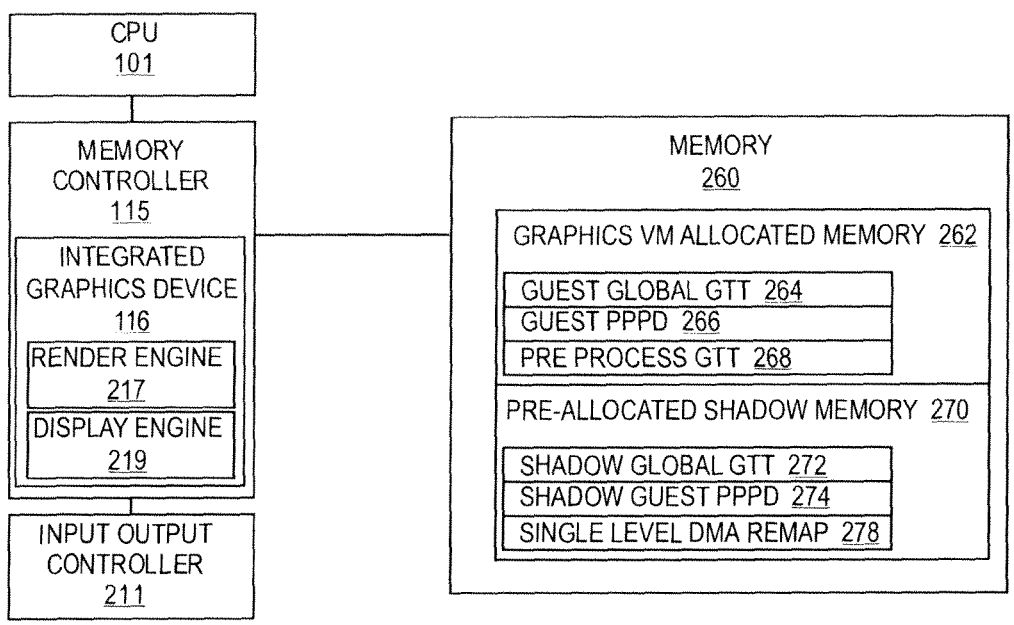
FIG. 6A is a block diagram illustrating an integrated graphics device in a virtual machine monitor (VMM) environment, in accordance with one embodiment.
Figure 6B:
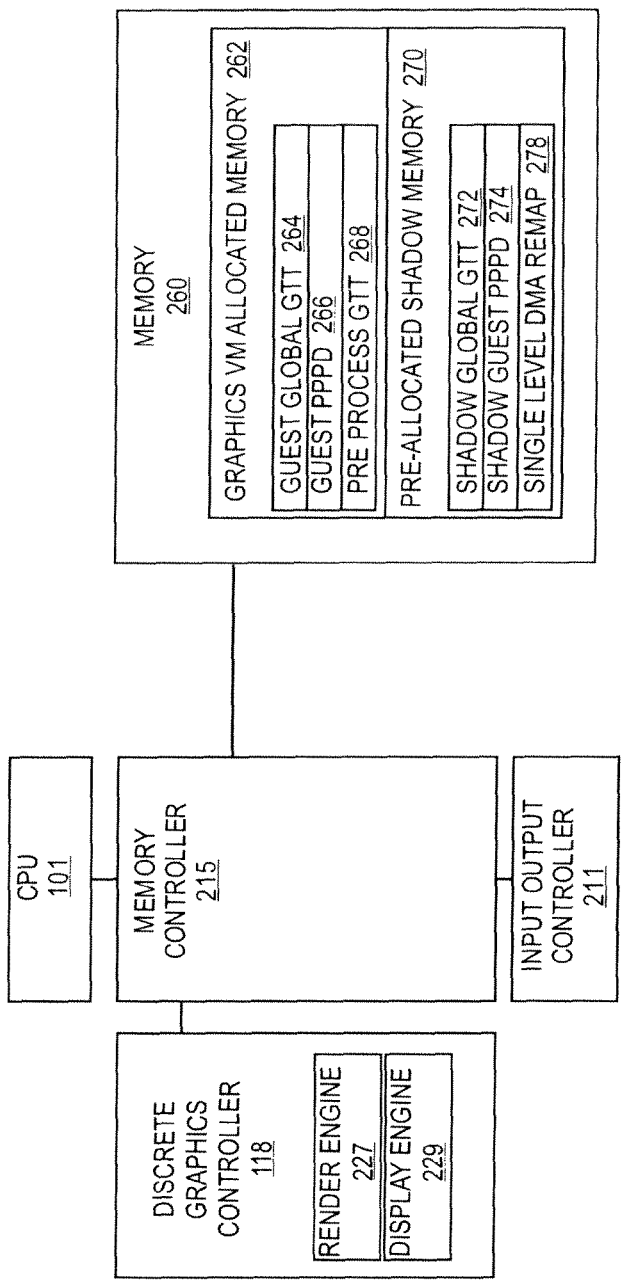
FIG. 6B is a block diagram illustrating a discrete graphics device in a virtual machine monitor (VMM) environment, in accordance with one embodiment.

According to some embodiments, any combination of one or more of graphics device 116, memory controller 215, and graphics controller 118 may be considered a graphics path. As defined herein, a graphics "chipset" may include, MC 115, device 116, and/or controller 118. For instance, a graphics chipset may be MC 115 and device 116, for integrated embodiment (e.g., FIGS. 1A and 6A). Alternatively, the graphics chipset could be MC 115 and device 118, for non-integrated embodiment (e.g., FIGS. 1B and 6B). Some cases, such as where the graphics device (e.g., graphics device 116) is integrated as part of a memory controller (e.g., MC 115) may be described as "integrated graphics" (e.g., where the graphics device is an integrated graphics device, such as device 116 as shown in FIGS. 1A and 6A). Alternatively, some case, such as where the graphics device (e.g., graphics device 118) is not integrated as part of a memory controller (e.g., MC 215) may be described as "discrete graphics" (e.g., where the graphics device is not part of or integrated with the memory controller, such as device 118 as shown in FIGS. 1B and 6B).

Figure 1B:
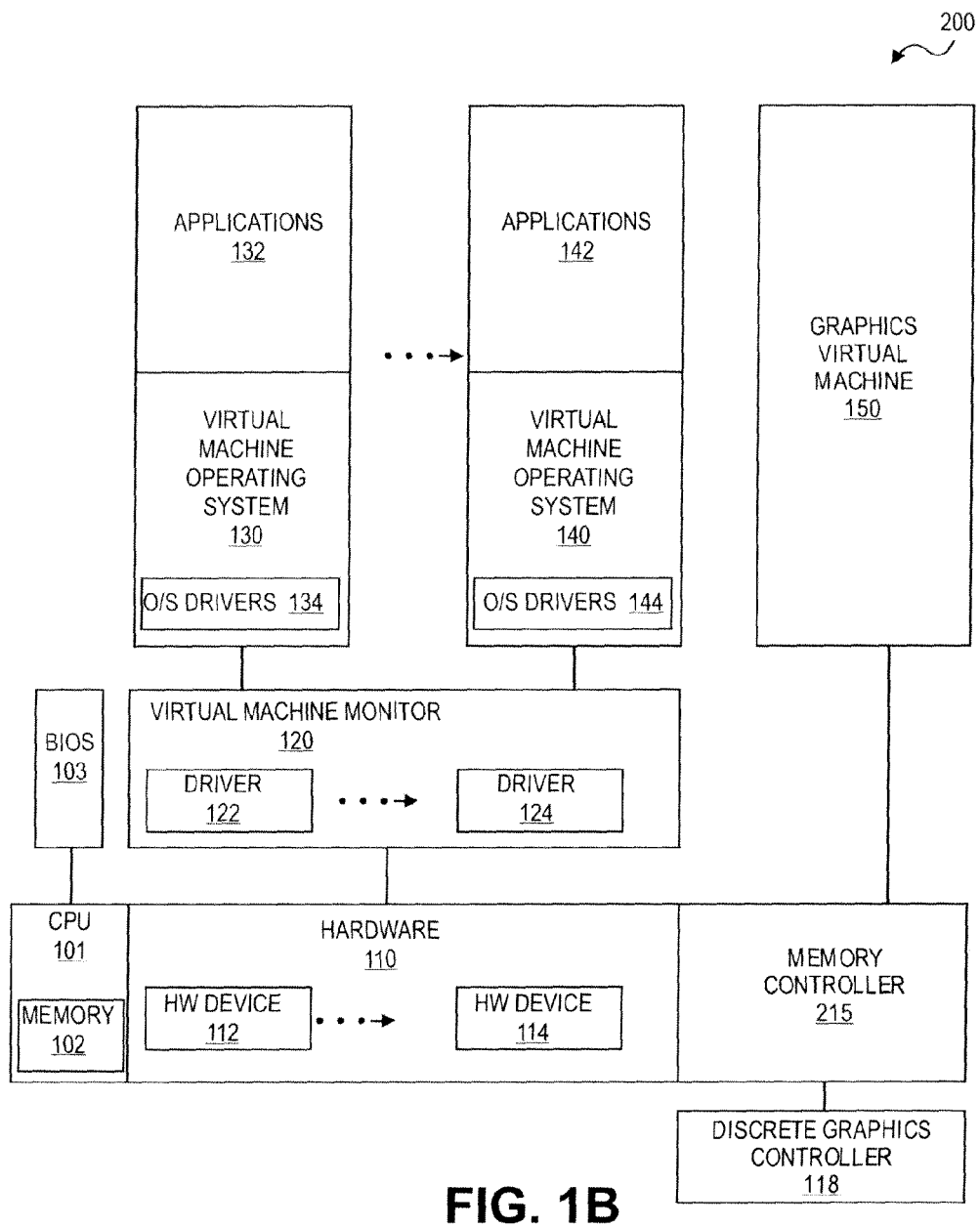
FIG. 1B is a block diagram illustrating a discrete graphics render path in a virtualized environment, in accordance with one embodiment.

FIG. 1B is a block diagram illustrating a discrete graphics render path in a virtualized environment, in accordance with one embodiment. For instance, FIG. 1B shows VMM environment 200 including virtual machine VMM 120 coupled to or between virtual machine operating system 130, virtual machine operating system 140 and hardware 110. FIG. 1B also shows virtual machine graphics VM 150, coupled memory controller 215, of hardware 110, which is in turn coupled to discrete graphics controller 118. Controller 118 may perform functions of a graphics device or controller as known in the art. Environment 200 may be, for example, embodied in a desktop computer, a laptop computer, a hand held computing device, a personal computer (PC), work station, electronic device, computational device, or the like.

FIG. 1B shows memory controller 215 coupled between graphics controller 118, CPU 101, and graphics VM 150. MC 215 may include or be described as memory controller device circuitry, and is described further below at FIG. 6B

Discrete graphics device 118 may "independently" translate GPAs of a direct memory access (DMA) requests from operating system 130, 140 or 150 into HPAs for directly accessing graphics data from physical addresses of a memory (e.g., HPAs 362 of memory 360, as described for FIG. 2), without using the VMM 120 (e.g., without sending the request to a graphic drivers in the VMM or otherwise accessing VMM 120 for graphics driver functionality while systems 130 and 140 access graphics controller 118 through VMM 120). Thus, graphics VM 150 may communicate with graphics controller 118, such as an order to use graphics VM 150 and controller 118 to satisfy the graphics needs of system 130 and system 140, without requiring graphics drivers in VMM 120. A discrete part may include one or more discrete graphics devices, such as discrete graphics controller 118 which is discrete from or not part of memory controller 215.

In some embodiments, a graphics device (e.g., graphics device 116 and/or controller 118) is assigned to a graphics VM (e.g., graphics VM 150), directly. Such direct assignment (e.g., without sending graphics data communicated between graphics VM 150 and device 116 through VMM 120) may be described as assigned graphics. Moreover, assigned graphics or direct assignment may include where a graphics VM can drive a graphics device or controller directly, and/or drivers in the graphics VM can program hardware or circuitry of the graphics device or controller without going through or using a VMM.

Chip set or controller 118 may be included in a discrete graphics card and/or may read graphics data from memory and provide graphics data to be displayed on a screen, display or monitor as images, such as video. Graphics controller 118 may be a discrete graphics device (e.g., such as a device that is not integrated with the memory controller, such as controller MC 215, and performs graphics display functions). Also, discrete graphics may describe a system or device with or including "glue logic", Input/Output interfaces, and/or a bus between MC 215 and controller 118. Controller 118 may perform the same functions described herein for device 116, except that controller 118 is a discrete controller in environment 200 and interacts or communicates with MC 215 as a discrete graphics controller. Correspondingly, MC 215 may perform the same functions described herein for MC 115, except that MC 215 uses discrete controller 118 in environment 200 and does not include an integrated graphics device.

Other components of FIG. 1B may be described by above with respect to FIGS. 1A and 6A, except that they are in environment 200 and interact or communicate with controller 118 (e.g., via MC 215) instead of with device 116. For instance, memory 102 may store instructions and/or data to be operated on translated, detected, and/or accessed by CPU 101, graphics VM 150, MC 215, and/or controller 118.

Current graphics devices (e.g., device 116 or 118) use a graphics address translation table to convert graphics addresses (e.g., of a DMA) to physical addresses. When the graphics device is assigned to a VM, then the translation tables may be built by the drives in the graphics VM. Since the graphics drivers only have a guest (GPA) view of memory, the address obtained by looking up this table yields a GPA address and has to be translated to HPA before a memory access (e.g., of graphics data to be rendered or displayed).

Figure 2:
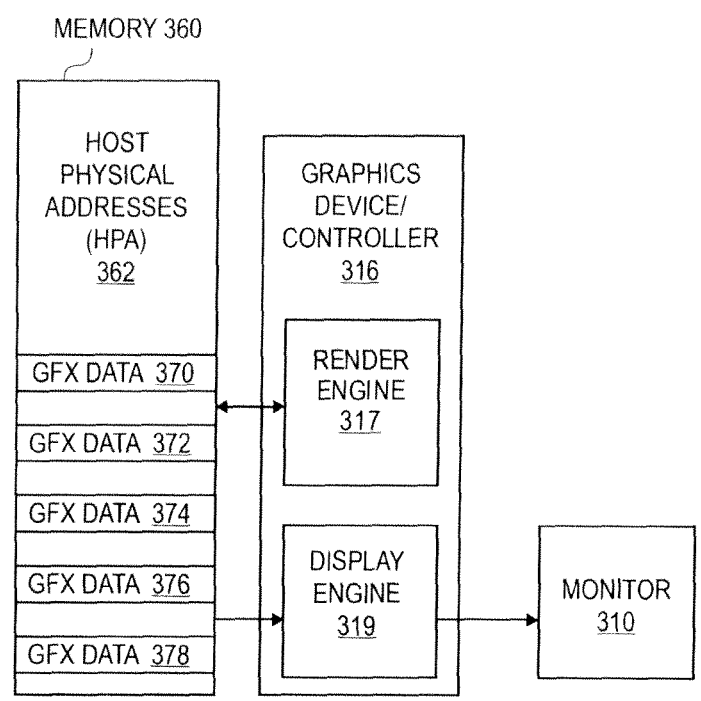
FIG. 2 is a block diagram illustrating graphics data stored at addresses in a memory and for display on a display or monitor, in accordance with integrated graphics device or a discrete graphics controller embodiment.

For example, FIG. 2 is a block diagram illustrating graphics data path in accordance one embodiment. FIG. 2 shows environment 300 including memory 360 coupled to graphics device/controller 316, which is coupled to monitor 310. Monitor 310 may be a display or a monitor, such as a computer or video monitor as known in the art. Device/controller 316 may represent device 116 or controller 118. Render engine 317 may be used to render the graphics data and display engine 319 may be used to display the data (that was rendered by the render engine). Moreover, engine 317 and 319 may use a render data path and a display data path, which already includes translation tables for converting graphics addresses to physical addresses. Memory 360 uses host physical address (HPAs) 362 for storing graphics data such as graphics data 370, 372, 374, 376 and 378 (e.g., such as by storing graphics data at HPA addresses). Memory 360 may be or include a memory and may contain data as described above for memory 102. Moreover, graphics data 370, 372, 374, 376 and 378 may be graphics instructions and/or data. For instance, any of data 370-378 may be graphics data for any application of applications 132 and/or 142. Thus, the data in adjacent locations or addresses of addresses 362 may not be from the same application. Data 370-378 may be "blocks" of data such as blocks of 4,096 (4K) bytes or other numbers of bytes of graphics data.

As shown, render engine 317 may access graphics data stored in memory 360 (e.g., through MC 115 or 215), such as by using HPAs 362 to write rendered graphics data to and read rendered graphics data from HPAs 362 of memory 360. Also, display engine 319 may access graphics data stored in memory 360 (e.g., through MC 115 or 215), such as by using HPAs 362 to read rendered graphics data from HPAs 362 of memory 360. Engine 319 may display the rendered graphics data on monitor 310, such as by displaying video feed, images, pixilated images or frames, etc. (e.g., after reading the rendered graphics data from memory 360). For instance, in some cases, applications 132 may include graphics data to be rendered and stored at addresses 362 by render engine 317. This rendered data may later be accessed and processed by display engine 319 and processed to be displayed on display 310.

In some embodiments, addresses for data blocks 370-378 are host hardware physical memory addresses or physical addresses in memory used by a direct memory access (DMA) device to access graphics data in a main memory. For example, a DMA request may be a request received by MC 115 and/or device 116 directly from a device, such as hardware device 112 to read data from or write data to memory 102, without using CPU 101. This reading or writing may be described as accessing memory, and may be in accordance with or caused by an application of applications 132. In a virtualized environment where a graphics device is assigned to a VM, the addresses in the DMA request may be GPA's, however, for the DMA request to be satisfied, by device 116, those GPA's must be translated to HPA's. A similar concept to that described for FIG. 2 applies for MC 215 and controller 118 (e.g., environment 200) of FIGS. 1B and 6B.

Figure 3:
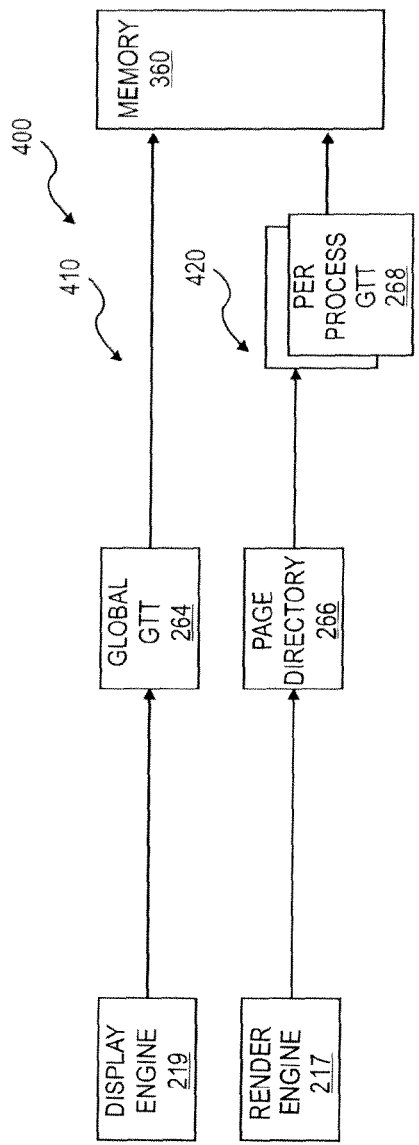
FIG. 3 is a block diagram illustrating a graphics data path in an advanced scheduler model, in accordance with one embodiment.

Although other embodiments are considered, graphics device 116 may include two primary data paths, such as a render data path and a display data path. For example, FIG. 3 is a block diagram illustrating a graphics data path in an advanced scheduler model, in accordance with one embodiment. An advanced scheduler as described herein may include functionality, such as that of Microsoft Advanced Scheduler, by Microsoft Corporation of Redmond, Wash. An advanced scheduler may be or include functionality that MC 115 supports. Moreover, an advanced scheduler may be or include a graphics memory manager operating system software or application. Specifically, an advanced scheduler may be part of an operating system or a graphics VM, such as graphics VM 150. FIG. 3 shows environment 400 including display path 410 and render path 420 in a non-virtualized environment. Display engine 219 uses graphics addresses to access data. The graphics addresses are translated to HPAs by global GTT 264. Render engine 217 uses a two level hierarchical page table lookup to translate graphics addresses to HPAs. Tables 264, 266 and 268 are necessary because graphics VM 150 uses virtual addresses to program device 116, while graphics data stored in memory 360 is stored in physical addresses 362 (e.g., see FIG. 2). Thus, data paths 410 and 420 incorporate translation tables to go from graphics addresses to physical addresses (e.g., HPAs). Since in a virtualized environment with direct assignment of the graphics device to a VM, the GTT 264 and page directory 266 are built or created (e.g., by having their entries created during boot-up) by graphics VM (e.g., graphics VM 150), they contain entries in GPA. Thus, these GPA addresses must be translated to HPA addresses to correctly access graphics data from memory 360. A similar concept as that described for FIG. 3 applies for MC 215 and controller 118 (e.g., environment 200) of FIGS. 1B and 6B.

Although FIGS. 3 and 6 depict translation tables 264, 266, 268, 272, 274 and 278, which may satisfy an advanced scheduler functionality, such as that of Microsoft Advance Scheduler, the concepts described herein for those tables can be applied to various other translation tables functionality or standards.

Figure 4:
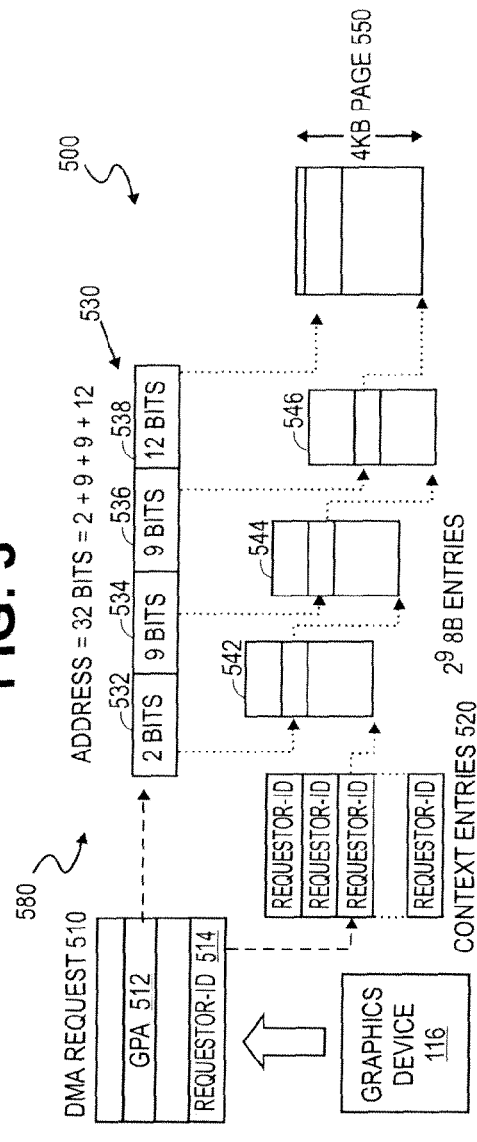
FIG. 4 is a block diagram illustrating a direct memory access (DMA) remapping 3-level walk, in accordance with one embodiment.

According to embodiments, a DMA remapping specification may use a multi-level page table walk to translate GPA addresses to HPA. The number of levels required for the walk depends on the size of the address space that needs to be supported. For example, for 32 bits, a 3-level page table walk is required. For larger systems, supporting 39+ bits of address space, a 4 level walk is required. For instance, FIG. 4 is a block diagram illustrating a direct memory access (DMA) remapping 3-level walk, in accordance with one embodiment. FIG. 4 shows environment 500 including graphics device 116 sending DMA request 510 to be translated or remapped by 3-level walk 580 (which may be referred to as table 580). In this example, request 510 includes GPA 512 and requester-ID 514 (e.g., bus, device, function). GPA 512 may represent a virtual memory address, such as an address received from applications 132. The context entry maps a request to the appropriate page table to be used or translation.

GPA 512 has 32 bits which may be divided into the 2, +9, +9, +12 bit look-ups. The first look-up, look-up 532, looks up using the first 2 bits of GPA 512 in page 542. The second look-up, look-up 534, looks up using the next 9 bits in page 544. The third look-up, look-up 536, looks up the next 9 bits in page 546. Remaining look-up, look-up 538, looks up the remaining 12 bits in 4 kilobyte page 550. It can be appreciated that the 12 bits of look-up 538 at each of the intermediate levels, allow page 550 to have a size of 4 kilobytes or less. 3-level walk 580 may be designed to provide remapping at a 4 kilobytes page granularity and at the same time allow page tables to fit within a 4 kilobytes page themselves. For example, walk 580 may translate 32 bit virtual addresses or GPAs of data 370-378, or blocks thereof, as described above with respect to In some embodiments, 3-level walk 580 may be created or built (e.g., such as by building page tables 542, 544, 546 and 550) at system initialization or boot-up, or loading of an application, by VMM 120. It is also considered that table 580 can be created or built by MC 115 and/or the VMM, such as during a boot-up or initialization of a computing system (e.g., computing device) implementing environment 100, and/or CPU 101 (e.g., according to BIOS 103). A similar concept as that described for FIG. 4 applies for MC 215 and controller 118 (e.g., environment 200) of FIGS. 1B and 6B.

Figure 5:
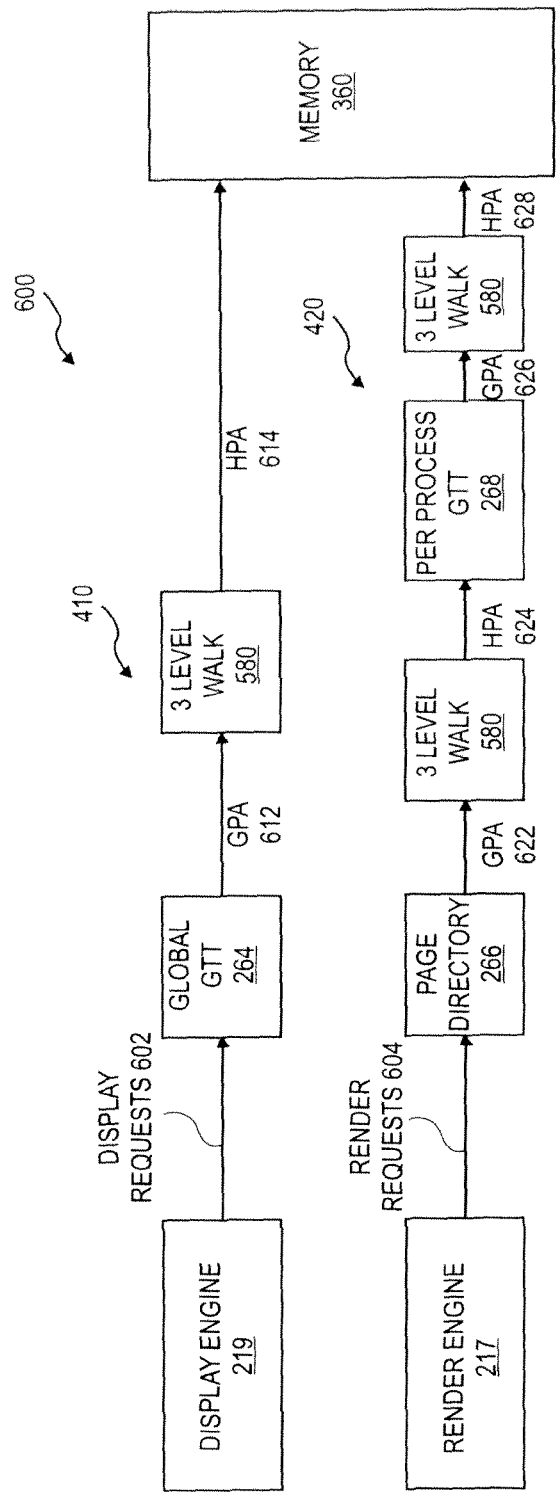
FIG. 5 is a block diagram illustrating graphics data paths in a VMM, with 3-level walk, in accordance with one embodiment.

It can be appreciated that performing a 3-level DMA remap walk, where necessary in path 410 and 420, on top of the current graphics and physical address translations (e.g., tables 264, 266 and 268), can introduce severe latency issues in those paths. For example, FIG. 5 is a block diagram illustrating graphics data paths in a virtualized environment prior to applying embodiments of the invention, with 3-level walk, in accordance with one embodiment. FIG. 5 shows environment 600 including display engine 219 transmitting display request 602 to global GTT 264 which outputs a GPA address 612 into a 3-level walk 580, which transmits HPA translation 614 to memory 360, in path 410. FIG. 5 also shows, render engine 217 sending render request 604 to page directory 266, which outputs a GPA address 622 into a 3-level walk 580, which outputs HPA translation 624 to per process GTT 268 which outputs a GPA address 626 to 3-level walk 580, which sends HPA translation 628 to memory 360, in path 420.

Also, as shown in FIG. 2, device/controller 316 does not have a real view of the physical addresses of memory 360. So GPA requests programmed by the graphics VM 150, must be translated or converted into HPAs to correctly access graphics data at HPAs 362 of memory 360.

More specifically, in FIG. 5 display request 602 may be a DMA request using a set of graphics addresses from applications 132 sent to or looked up in global GTT 264. Then, GTT 264 outputs or transmits GPA translation 612 (here, since graphics VM 150 does not have a real view of memory, it thinks that the GPAs are HPAs of memory). Next, 3-level walk 580 converts translation 612 into HPA 614, and sends or transmits translation 614 to memory 360. Note that in addition to the translation required at table 264, path 410 includes an additional 3-level walk at walk 580.

Furthermore, render request 604 may be a DMA request using graphics addresses from applications 132 sent to or looked up in page directory 266. Then directory 266 sends or transmits GPA translation 622, to point to the next level of tables (again, graphics VM 150 creates a table that has GPA entries). However, this is a GPA, so it may be translated to HPA. Next, 3-level walk 580 converts translation 622 into HPA translation 624, and sends or transmits translation 624 to per process GTT 268. Per process 268 transmits or sends GPA translation 626. Next, to 3-level walk 580, converts translation 626 into HPA translation 628, and sends or transmits translation 628 to memory 360. Note that in addition to translations at table 266 and 268, path 420 requires 6 additional levels of walk through.

A similar concept as that described for FIG. 5 applies for MC 215 and controller 118 (e.g., environment 200) of FIGS. 1B and 6B. For instance, request 602 and 604 may be generated by engine 229 and 227 respectively.

Current implementations, as defined by the Intel's VT-d technology. Some embodiments use a multi-level table to translate address from GPA to HPA (such as to translate a 32 bit address, a 3 level table may be used). It can be appreciated that a graphics device or controller may be a high performance device that has stringent latency requirements. Inability to meet the latency requirements can lead to display tearing, and dropped frames or rendering, resulting in user visible defects in images displayed on a monitor or display. Thus, the shadow tables may provide a more efficient way to translate GPAs to HPAs.

According to some embodiments, the tables and walk throughs of FIG. 5 can be combined to eliminate or reduce multiple level walk throughs and provide an implementation that will result in higher performance. For instance, the 3-level walk between per process GTT 268 and memory 360 can be replaced by a single level remappping table. Moreover, one shadow table can be created that combines global GTT 264 and the 3-level walk 580 between that table and memory 360. Likewise, another shadow table can be created that combines page directory 266 and the 3 level walk between page directory 266 and table 268. Thus, these shadow tables can convert the virtual addresses (graphics addresses) received in path 410 and path 420 from engine 219 and engine 217, respectively, to HPAs directly.

According to embodiments, environment 100 may be used to create entries of translation tables to translate virtual memory addresses or guest physical addresses (GPAs) of requests to access graphics data (e.g., DMA requests) from applications 132 and/or 142, to host hardware physical memory addresses (e.g., HPAs) at which the graphics data is stored or located in memory 102. For example FIG. 6A is a block diagram illustrating an integrated graphics device in a VMM environment, in accordance with one embodiment. FIG. 6A shows memory controller 115 coupled between CPU 101, graphics controller 116, input/output controller 211 (such as an IO memory controller), and memory 260. Memory 260 may be the same memory as memory 102 and or memory 360, may be a main memory, may be a RAM memory, or may be other memory.

FIG. 6A shows MC 115 including graphics device 116, which has render engine 217, and display engine 219. Render engine 217 may be used to render the graphics data and display engine 219 may be used to display the data (that was rendered by the render engine). Moreover, engine 217 and 219 may use a render data path and a display data path, which already includes translation tables for converting graphics addresses to physical addresses. In some cases, engine 217 and 219 may use or include one or more translation tables stored in memory 260. Also, engine 217 and 219 may represent engine 317 and 319.

For example, memory 260 may include graphics VM allocated memory 262 and/or pre-allocated shadow memory 270. Memory 262 includes tables, such as guest global guest translation table (GTT) 264 (which may be referred to as table 264), guest per process page directory (PPPD) 266 (which may be referred to as table 266) and per process GTT 268 (which may be referred to as table 268 and/or a PPGTT). Tables 264, 266 and 268 may be used to translate graphics addresses to guest physical addresses. The tables stored in memory 262 may be created or built by graphics drivers, such as during a boot-up or initialization of a computing system implementing environment 100, and/or CPU 101 (e.g., according to BIOS 103). Tables stored in memory 262 may also be created by graphics drivers during loading or execution of an application of applications 132 or 142. In some cases, "loading" and "launching" may describe the same functions or occurrences, such as when a computer program in initiated and loaded into main memory by a processor. Similarly, sometimes, "executing" and "running" may describe the same functions or occurrences, such as when a computer program loaded into memory by a processor is executed to perform functions according to that program (e.g., including displaying and rendering of graphics data). Such drivers may be part of graphics VM 150, such as by being software, an application program, application code. Moreover, such drivers may be instructions stored in a machine-accessible medium, that can be executed by a machine (e.g., a processor) cause the machine to perform the functions described herein for the drivers, and/or to create and/or use tables (e.g., shadow tables) as described herein. Also, such drivers may include commands from an application to hardware to perform processing and/or displaying of data. For instance, the drivers may cause MC 115, MC 215, device 116, controller 118, and/or memory 260 to perform functions as described herein.

For example, memory 270 may include various shadow translation tables, such as shadow global GTT 272 (which may be referred to as table 272), shadow guest PPPD 274 (which may be referred to as table 274), and/or a single level direct memory access (DMA) remap 278 (which may be referred to as table 278). Tables 272, 274 and 278 may replace or function in the place of tables 264, 266 and 268, respectively, during rendering and/or display of graphics data (e.g., such as in accordance with DMA requests). In some cases only one or two of tables 272, 274 and 278 may exist and/or be used to display graphics. According to some embodiments, memory 260 may include memory 262 only, memory 270 only, or memory 262 and memory 270.

Memory storage locations, addresses, and/or space for tables of memory 270 (e.g., tables 272, 274 and/or 278 whether contiguous or not) may be reserved or pre-allocated in memory 260, such as during boot-up or initialization of a system implementing environment 100, and/or CPU 101 (e.g., according to BIOS 103 without reporting the allocated memory to the VMM). Specifically, space for tables of memory 270 may be reserved or pre-allocated in memory 260 by BIOS 103 and/or VMM 120, during boot-up or initialization of a system implementing environment 100, and/or CPU 101.

According to some embodiments, during boot-up, the BIOS may reserve sufficient space to store a graphics address to HPA translation table, such as shadow global GTT 272 as well as reserve sufficient storage to store a translation table to pre-translate PPPD entries to HPA (such as table 274). The pre-translated table 274 ensures that an inline remapping walk is not required after looking up the PPPD entry, such as shadow guest PPPD 274. The size of the table 274 may be constrained to support a specific number of applications (for e.g., up to 100, 200, 300, 400, 1000 or any combination thereof of applications). Creating of table 278 is described further below with respect to FIG. 9. Similarly, during boot-up, or initialization of a graphics program of a VM application (e.g., such as applications 132), the BIOS may include an entry to reserve sufficient space to store a single-level DMA remap table (e.g., remap 278) to translate data from GPAs into HPAs.

For instance, table 278 may perform a similar operation or function as that of a table to translate GPAs into HPAs, such as the same function as that performed by 3-level walk 580 of FIG. 4. Thus, remap 278 may be a single-level remapping table (e.g., a table that cannot be contained within a 4K-bytes page anymore) and may be located in contiguous memory. Having a contiguous table (e.g., a single level lookup table) avoids the latency induced by a walking through the levels of a multi-level table, providing the benefit of quicker and more efficient translation or conversion of GPAs to HPAs during rendering and/or displaying of graphics data. Contiguous memory may be described as addresses or locations in a memory that share an edge or boundary, touch, are neighboring; are adjacent, are connected without a break, and/or are immediately adjacent. For example, contiguous addresses in memory may be addresses that come one after the other. Alternatively, addresses or locations that are stored in locations having a fragmented order, or locations that do not include part of the table data, may be described as non-contiguous memory. It is contemplated that table, 272, 274 may be located or stored in contiguous memory (e.g., one or more of those tables may each be stored in contiguous memory locations of memory 260). Also, table 278 may be in locations or addresses of memory that are separated from or not contiguous with tables 272 or 274. In some cases, the address of memory storing table 272 are adjacent to those storing table 274, but neither the addresses for table 272 nor 274 are adjacent to those for table 278. The size of table 278 will depend on the graphics address space of the graphics VM (e.g., device 116). For example, table 278 may contain an 8K-byte entry per each 4K-byte page, and hence table 278 may require an 8 megabyte contiguous table in memory 270 to provide translation for a 4 gigabyte graphics address space. The space for all tables of memory 270 may be allocated by the system BIOS and not reported to the VMM or VM's, as noted above.

Memory 270 may also include the GPA to HPA translation table represented by table 278. Table 278 may be a single, two, three or 4 level table. Table 278 (e.g., such as cases where table 278 represents 3 level walk 580 of FIG. 4) may be created by the VMM (e.g., without processing or accessing MC 115 or 215) during boot-up or initialization of a computing system, implementing environment 100, and/or CPU 101 (e.g., according to BIOS 103).

Table 278 may be created or built by the VMM, such as during a boot-up or initialization of a computing system implementing environment 100, and/or CPU 101 (e.g., according to BIOS 103). Also, tables 272 and 274 maybe created by the hardware (e.g., MC 115 or 215). In some cases, entries to table 272 or 274 (e.g., shadow tables) maybe created when circuitry or hardware of MC 115 or MC 215 (e.g., detection circuitry), detects or senses creation of an entry to corresponding table 264 or 266 (e.g., non-shadow tables) created by graphics VM 150. According to some embodiments, circuitry or hardware of MC 115 or MC 215 senses creation of the non-shadow entry to table 262 and creates a corresponding or associated entry to table 272 (e.g., the translated HPA entry is placed at the same location or address in table 272 as the entry or update to table 262). Likewise, in some cases, circuitry or hardware of MC 115 or MC 215 senses creation of the non-shadow entry to table 264 and creates a corresponding or associated entry to table 274 (e.g., the translated HPA entry is placed at the same location or address in table 274 as the entry or update to table 264).

Also, tables 264, 266, 268, 272, 274 and/or 278 may be updated during operation of a computing system implementing environment 100, such as during launching, loading, initialization, and/or execution of an application (e.g., a graphics application or an application including graphics instructions to display images on a display or monitor), such as a VM application or one of applications 132. For instance, graphics VM 150 and/or drivers of graphics VM 150 may update tables 272, 274 and/or 278 when an application of applications 132 is launched, in memory 270.

In some cases, entries to table 272 or 274 (e.g., shadow tables) will be updated when circuitry or hardware of MC 115 or MC 215 senses update of an entry to corresponding table 264 or 266 (e.g., creation of a new entry or writing over an existing entry of table 264 or 266 non-shadow tables) by graphics VM 150. According to some embodiments, circuitry or hardware of MC 115 or MC 215 senses update of a non-shadow entry existing in table 264 and updates a corresponding or associated entry of table 272 (e.g., the translated HPA entry is placed at the same location in table 272 as the update to table 264). For instance, the entry in table 264 may be offset by the same amount of address (e.g., plus 5) from one base address (e.g., 1000) in memory (e.g., to be at 1005), while the entry in table 272 is offset by the same amount of address (e.g., plus 5) from a different base address (e.g., 2000) in memory (e.g., to be at 2005). Likewise, in some cases, circuitry or hardware of MC 115 or MC 215 senses update of a non-shadow entry existing in table 266 and updates a corresponding or associated entry of table 274 (e.g., the translated HPA entry is placed at the same location in table 274 as the update to table 266). Thus, tables 274 and 266 may be indexed the same.

In some cases, graphics VM 150 may include an advanced scheduler, such as an advanced scheduler including functionality or portions of functionality from the Microsoft Advanced Scheduler, by Microsoft Corporation of Redmond, Wash. For instance, a graphics VM that complies with the Advanced Scheduler architecture may create, store, and/or update tables 264, 266, 268, when an application is launched. Translation tables 264, 266, 268, 272, 274 and/or 278 may satisfy an advanced scheduler's functionality, such as Microsoft Advance Scheduler functionality. It is also contemplated that translation tables 264, 266, 268, 272, 274 and/or 278 may satisfy another standard as know in the art, other than an advance scheduler's functionality.

According to embodiments, graphics VM 150 may access the graphics device 116 without using or accessing VMM 120, while systems 130 and 140 access graphics device 116 through VMM 120. Specifically, MC 115 may use entries of table 272 to translate a virtual address (graphics address) used by an application to a host hardware physical memory address of graphics data in main memory (e.g., such as an HPA). Similarly, MC 115 may create entries of table 274 to translate from a virtual address (graphics address) of a per process page directory to a host hardware physical memory address of graphics data in the main memory (e.g., HPA), using table 274.

Although FIGS. 1A and 6A describe embodiments with respect to an integrated graphics device, the concepts described herein apply to various other graphics devices, chipsets, circuitry, hardware, render paths, and/or display paths. For instance, a discrete graphics path may use a similar mechanism as the integrated path of environment 100. A discrete graphics path may be a path capable of accessing the graphics data by issuing DMA requests with guest physical address (GPA) and having a graphics controller and/or memory controller translate the GPAs to host physical addresses (HPAs) or physical memory addresses of a main memory without accessing a VMM and/or without accessing a graphics VM.

According to embodiments, environment 200 may be used to create entries of translation tables to translate virtual memory addresses or guest physical addresses of requests to access graphics data (e.g., DMA requests) from applications 132 and/or 142, to host hardware physical memory addresses (e.g., HPAs) at which the graphics data is stored or located in memory 102. For example FIG. 6B is a block diagram illustrating a discrete graphics device in a virtual machine monitor (VMM) environment, in accordance with one embodiment. FIG. 6B shows memory controller 215 coupled between graphics controller 118, CPU 101, input/output controller 211 (such as an IO memory controller), and memory 260. Memory 260 may be the same memory and/or perform the same functions as memory 102. Also, memory 260 may be a main memory, may be a RAM memory, or other memory.

FIG. 6B shows MC 215 coupled to graphics controller 118, which has render engine 227, and display engine 229. Render engine 227 may be used to render the graphics data and display engine 229 may be used to display the data (that was rendered by the render engine). Moreover, engine 227 and 229 may use a render data path and a display data path, which already includes translation tables for converting graphics addresses to physical addresses. In some cases, engine 227 and 229 may use or include one or more translation tables stored in memory 260. Render engine 227, and display engine 229 may perform the same functions described herein for render engine 217, and display engine 219, except that render engine 227, and display engine 229 are part of a discrete controller in environment 200 and interact or communicates with MC 215 as a discrete render engine, and a discrete display engine. Also, engine 227 and 229 may represent engine 317 and 319.

Other components of FIG. 6B may be described herein with respect to FIGS. 1A and 6A, except that they are in environment 200 and interact or communicate with controller 118, render engine 227, and display engine 229 (e.g., via MC 215), instead of with device 116, render engine 217, and display engine 219.

According to embodiments, environment 200, graphics VM 150, VMM 120, hardware 110, CPU 101, memory 102, BIOS 103, systems 130 and 140, and MC 215 may reserve memory space for, create, update and use table 264, table 266, table 268 shadow global GTT 272, shadow guest PPPD 274, and/or a single level direct memory access (DMA) remap 278, as described herein with respect to creation of those tables for environment 200 and FIGS. 1A and 1B.

According to embodiments, graphics VM 150 may access the graphics device 118 without using or accessing VMM 120, while systems 130 and 140 access graphics device 118 through VMM 120. In general, the graphics controller wants to be able to (e.g., it is more efficient for the system and/or graphics paths) receive command instructions (e.g., graphics instructions) from graphics VM 150 (e.g., instructions including GPAs) and access data in memory (e.g., graphics data), without requiring VMM 120 to provide translation of the GPAs to HPAs. For example, device 118 may be a discrete graphics controller, such as a graphics controller to communicate with operating system 130 and/or 140 without accessing VMM 120. To accomplish this, controller 118 and/or MC 215 may include circuitry, hardware, software and/or logic to use the entries of translation tables to translate from GPAs to HPAs. Specifically, controller 118 and/or MC 215 may use entries of table 272 to translate a virtual address (graphics address) used by an application in a graphics translation table to a host hardware physical memory address of graphics data in main memory. Similarly, controller 118 and/or MC 215 may create entries of table 274 to translate from a virtual address of a per process page directory (e.g., a GPA) to a host hardware physical memory address of graphics data in the main memory, using table 274.

As shown in FIGS. 1A, 1B, 6A, and 6B, environment 100 or 200 allows direct assignment of input/output devices (such as device 112, 114 or 116) to a virtual machine (such as system 130, 140 or 150) when an IO device is directly assigned to a VM, then the device drivers for that device can be moved out of VMM 120 and into a controlling VM. For example, by directly assigning graphics device 116 or controller 118 to graphics VM 150, all of the graphics drivers that would be normally in VMM 120 (e.g., such as by being a driver such as driver 122) can be moved into graphics VM 150 instead. However, since a VM has a virtualized view of the memory (e.g., graphics VM 150 has a virtualized view of memory 102), the device drivers or drivers in the VM (e.g., graphics VM 150) use GPA to program the IO device (e.g., device 116 and/or controller 118). To get access to the correct data, MC 115 or 215 (e.g., part of the graphics chipset) may be required to translate the addresses issued by the IO device from GPA to HPA. More particularly, because of its "virtualized view" of memory, each partition or VM may send DMA request having GPA's. However, since the graphics devices (e.g., device 116 and/or graphics controller 118) have a "virtualized view" (e.g., a view of the physical memory addresses), in order for the graphics devices to correctly satisfy the requests, the GPA's must be translated to HPA's.

This translation may be performed by MC 115 or 215 when device 116 or controller 118 receive DMA requests from system 130 via graphics VM 150 having GPAs. The addresses of these DMA requests are translated by MC 115 or 215 pointing to the memory address in table 272 or 274 that corresponds with the address pointed to by the DMA requests in tables 264 or 266. Thus, instead of converting or translating the GPAs to HPAs using tables 264 or 266 and a 3-level walk (or other GPA to HPA table), the DMA GPAs are translated to HPAs using table 272 or 274. The graphics data is then more quickly and efficiently accessed in the memory by the render and/or display engine.

Specifically, graphics VM 150 has a guest view of the physical addresses of memory 260 since graphics VM 150 accesses memory 260 through MC 115 or 215. Thus, the GPAs of the DMA requests from applications 132 must still be translated or converted by a memory controller, a graphics device, and/or a combination thereof into HPAs to correctly access graphics data from memory 260.

Figure 7:
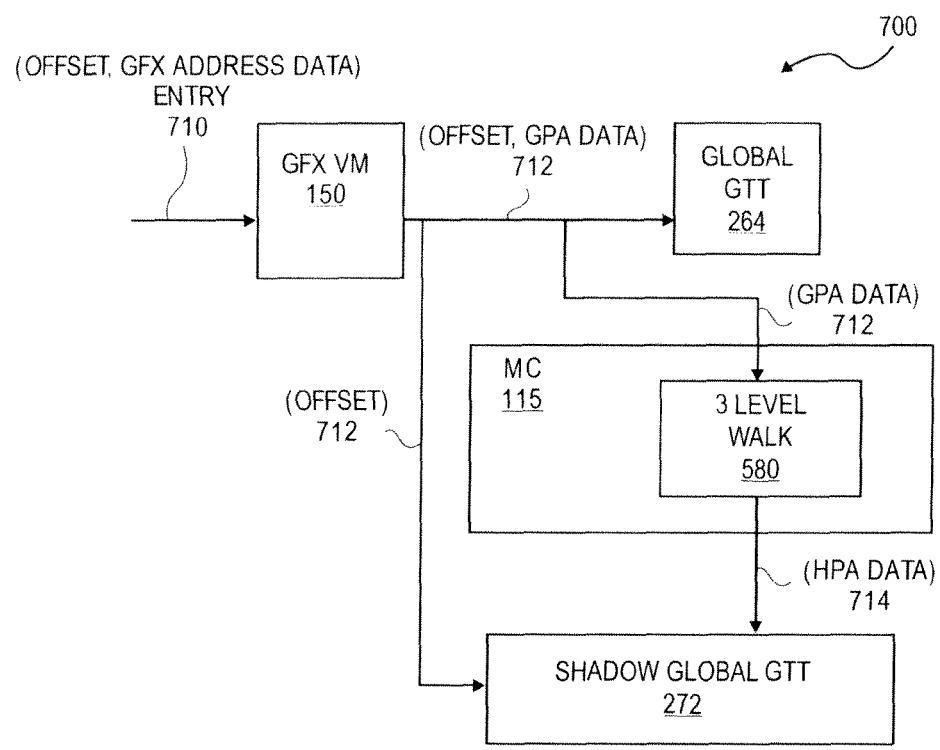
FIG. 7 is a block diagram illustrating an environment for creating a shadow global guest translation table (GTT), in accordance with one embodiment.

The shadow tables' entries are DMA remapped (e.g., from GPA to HPA) whenever the guest tables (264, 266) are created or updated, and hence contain HPA entries. For instance, FIG. 7 is a block diagram illustrating an environment for creating a shadow global GTT, in accordance with one embodiment. FIG. 7 shows environment 700 having graphics VM 150 attempting to install a GPA GTT entry into the guest GTT. For instance, graphics VM 150 may install entry 710 (e.g., including an offset and graphics address as data to be used by DMA requests from applications 132). The table 264 is created, stored, installed or updated at a location specified in (offset, GPA data) 712 with the GPA data supplied in (offset, GPA data) 712

Since graphics VM 150 does not have a real view of the physical addresses of memory 260, data portion of (offset, GPA data) 712 (e.g., (offset, GPA data) 712 includes an offset and GPA as data) of table 264 will need to be translated or converted into HPAs to correctly access graphics data from memory, each time the data at that address (e.g., at GPA 712) is to be accessed by a DMA requests from applications 132. Instead of performing such numerous conversions, a more efficient system can be set up by translating or converting (offset, GPA data) 712 into the proper HPA, storing that conversion in a shadow table at the same corresponding position in the table. Instead of performing a lookup (e.g., conversion or translation) in table 264 and then another lookup in table 580 each time a DMA request from applications 132 is processed by path 410, a single level lookup in the shadow table can be performed to more quickly and efficiently convert the DMA request to the HPA address.

Accordingly, environment 700 shows (offset, GPA data) 712 translated or converted by MC 115 into (offset, HPA data) 714 data portion of update is translated, which is stored in shadow global GTT table 272 at the same corresponding position within the table. Thus, (offset, GPA data) 712 is shown being sent to two locations, or being "forked" by the MC 115 to update table 264 and table 272. MC 115 may include or be described lookup circuitry, such as circuitry to perform this translation or conversion (see also FIG. 8). Now, at runtime (e.g., during execution of a graphics application on a VM), instead of performing a lookup (e.g., conversion or translation) in table 264 and then another lookup in table 580 each time a DMA request from applications 132 is processed by path 410, a single level lookup in shadow table 272 can be performed to more quickly and efficiently convert the DMA request to the HPA address. Specifically, shadow table GTT 272 can now be used to perform a single level lookup to convert or translate the graphics address of a DMA request into the (HPA data) 714 (e.g., by looking up the corresponding address in the shadow table to get (HPA data) 714). See FIG. 12 for more explanation.

Figure 8:
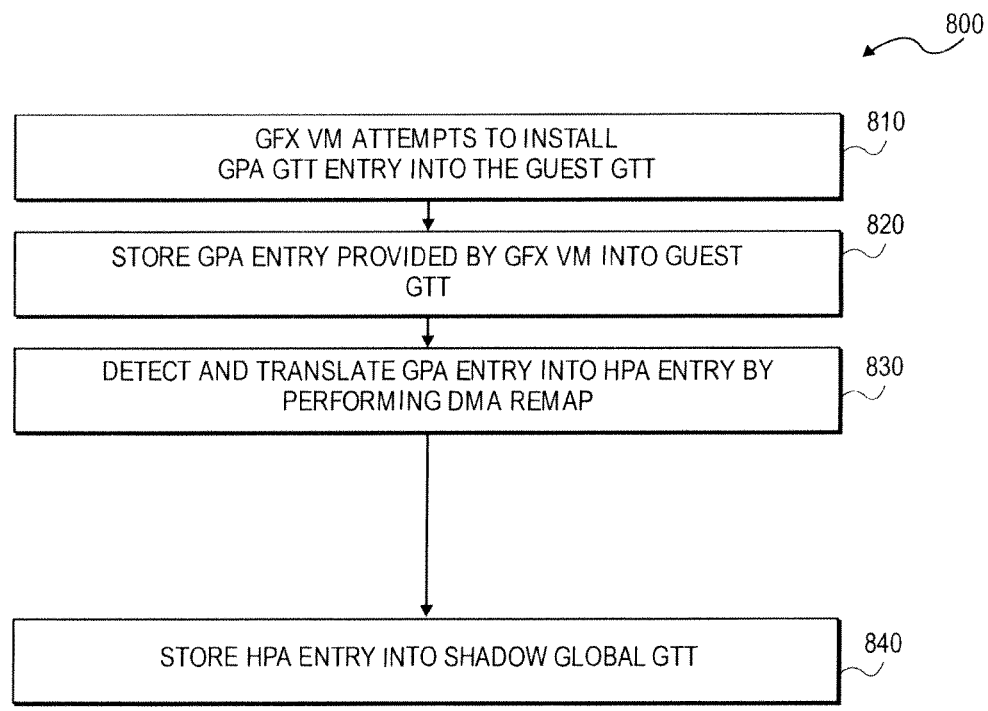
FIG. 8 is a flow diagram of a process for creating a shadow global GTT.

Moreover, FIG. 8 is a flow diagram of a process for creating a shadow global GTT, in accordance with one embodiment. FIG. 8 shows process 800 such as a process that may correspond to environment 700 and/or otherwise creating an entry of a shadow global GTT. FIG. 8 shows process 800 including block 810 where a Gfx VM attempts to install a GPA GTT entry into the guest GTT. For instance, graphics VM 150 may receive or access and convert a graphics address entry (e.g., from a graphics application or device driver) into a GPA entry for a global GTT. Block 810 may include a graphics VM or an operating system receiving or accessing entry 710 as described above for FIG. 7. Also, Block 810 may include descriptions above with respect to graphics VM 150 creating, translating, converting, or building (offset, GPA data) 712 of global GTT 264 from entry 710. At block 820, the GPA entry provided (e.g., accessed and converted) by the Gfx VM is stored into the Guest GTT, such as is described above for (offset, GPA data) 712 and table 264.

Next, at block 830, the GPA entry installed by the Gfx VM is detected (e.g., accessed or forked off) and translated into an HPA entry (e.g., the GPA data portion is translated to HPA, but the index, offset, or location from (offset, GPA data) 712 does not change). Block 830 may include MC 115 detecting entries being added to global GTT 264 by Gfx VM 150 or otherwise (e.g., such as by another entity storing entries in main memory for a GTT). Block 830 may also include MC 115 translating (offset, GPA data) 712 into (HPA data) 714 using 3-level walk 580 (or another GPA to HPA translation, such as single level remap 278), as described above for FIG. 7. The translation at block 830 may be described as a DMA remap to translate data from GPAs into HPAs (e.g., such as using remap table 278).

Entry 710 and/or (offset, GPA data) 712 may be installed during boot-up or initialization of environment 100 or during loading or execution of an application of applications 132 or 142. Similarly, MC 115 may detect or sense (offset, GPA data) 712 being inserted in, created in or stored in memory for global GTT 264, such as using software, firmware, logic, circuitry, traps, stops and/or appropriate devices or processes. Although block 830 may include a translation by a 3-level walk and FIG. 7 shows 3-level walk 580, other appropriate GPA to HPA translations may be used (e.g., such as a single level walk, like table 278).

At block 840 the HPA entry is stored into the shadow global GTT. Block 840 may include (HPA data) 714 being stored in shadow global GTT 272 in the same corresponding position as the guest GTT, as described above for FIG. 7.

Block 840 and/or FIG. 7 may include storing an entry, such as to create or build a shadow table as described above with respect to table 272 of FIG. 6A or 6B.

Figure 9:
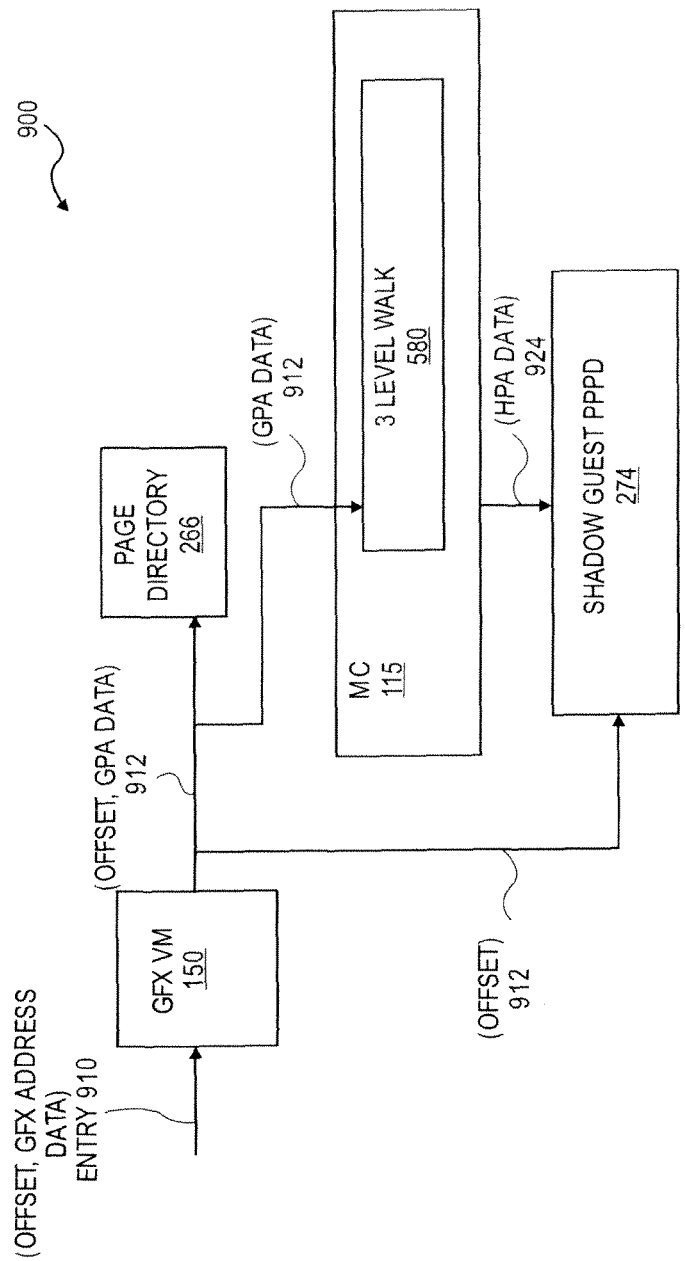
FIG. 9 is a block diagram illustrating an environment for creating a shadow guest per process page display (PPPD), in accordance with one embodiment.

A similar concept as that described for FIGS. 7-8 applies for MC 215 and controller 118 (e.g., environment 200) of FIGS. 1B and 6B. FIG. 9 is a block diagram illustrating an environment for creating a shadow guest per process page display (PPPD), in accordance with one embodiment. FIG. 9 shows environment 900 having graphics VM 150 attempting to install a GPA PPPD entry into the guest PPPD. For instance, graphics VM 150 may install entry 910 (e.g., including an offset and graphics address as data to be used by DMA requests from applications 132) into the PPPD. The offset and graphics address data of entry 910 may be included in requests 604. Graphics VM 150 creates, translates, converts, or builds (offset, GPA data) 912 of Page Directory 266 from entry 910. The table 266 is created, stored, installed or updated at a location specified in (offset, GPA data) 912 with the GPA data supplied in (offset, GPA data) 912.

Similar to the description above for FIG. 7, since graphics VM 150 does not have a real view of the physical addresses of memory 260, the data portion of (offset, GPA data) 912 will need to be translated or converted into HPAs to correctly access graphics data from memory, each time the data at that address (e.g., at GPA 912) is to be accessed by a DMA requests from applications 132. Thus, again, at runtime instead of performing such numerous conversions, a more efficient system can be set up by translating or converting (offset, GPA data) 912 into the proper HPA, storing that conversion in a shadow table at the same corresponding position within the table. Instead of performing a lookup in table 266 and then another lookup in table 580 each time a DMA request from applications 132 is processed by path 420, shadow table 274 can be used to perform a single level lookup to convert or translate the graphics address to HPA.

Accordingly, environment 900 shows (offset, GPA data) 912 translated or converted by MC 115 into (HPA data) 924, which is stored (e.g., stored, installed, or updated) in table 274 at the same corresponding position as in table 266. (offset, GPA data) 912 is shown being sent to two locations, or being "forked" by being sent to table 266, as well as being detected, accessed and/or sent to MC 115. MC 115 may include or be described lookup circuitry, such as by including circuitry to perform this translation or conversion (see also FIG. 10). Instead of performing a lookup in table 266 and then another lookup in table 580 each time a DMA request is processed by path 420, a single level lookup in shadow table 274 can be performed to more quickly and efficiently convert or translate a graphics address to HPA. See FIG. 12 for more explanation.

Figure 10:
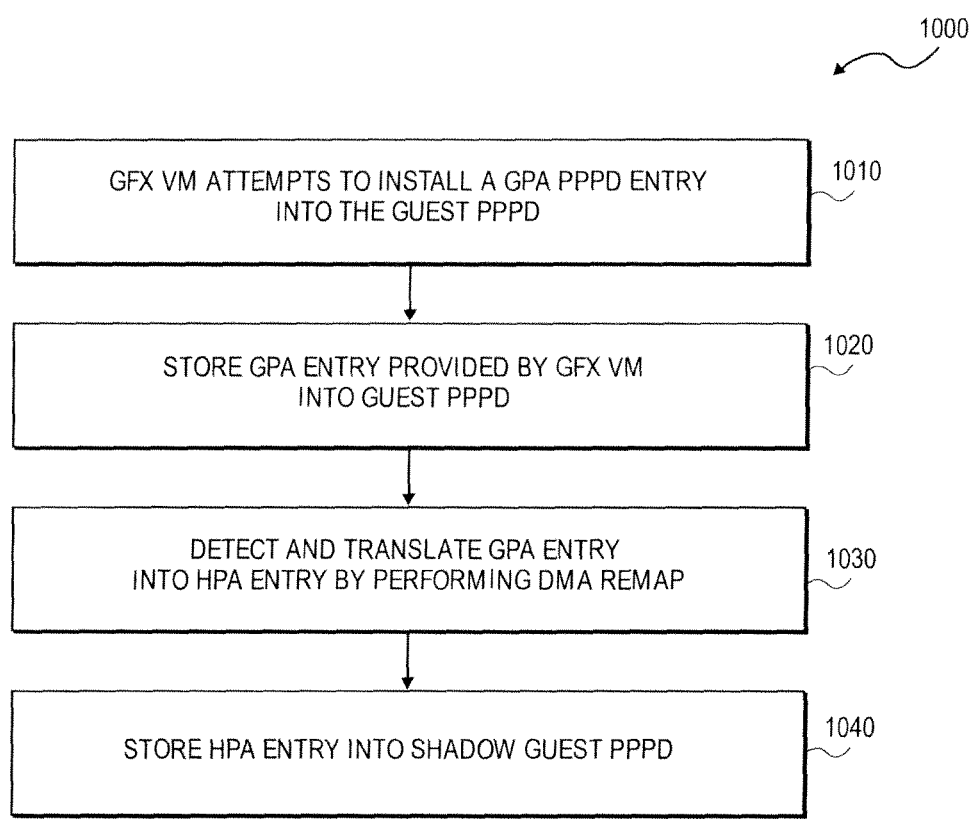
FIG. 10 is a flow diagram of a process for creating a shadow guest PPPD, in accordance with one embodiment.

Moreover, FIG. 10 is a flow diagram of a process for creating a shadow guest PPPD, in accordance with one embodiment. FIG. 10 shows process 1000, such as a process that may or may not correspond to environment 900 and/or otherwise creating an entry of a shadow guest PPPD. FIG. 10 shows process 1000 including block 1010 where Gfx VM attempts to install a GPA PPPD entry into the guest PPPD. For instance, graphics VM 150 may access (or detect) and convert a graphics address entry (e.g., from a graphics application or device driver) into a GPA entry for a guest PPPD. Block 1010 may include a graphics VM or an operating system receiving or accessing entry 910 as described above for block 810 and/or FIG. 9. Also, Block 1010 may include descriptions above with respect to graphics VM 150 creating, translating, converting, or building (offset, GPA data) 912 of table 266 from entry 910. At block 1020, the GPA entry provided (e.g., accessed and converted) by the Gfx VM is stored into the guest Page Directory, such as is described above for (offset, GPA data) 912 and table 266.

Next, at block 1030, the GPA entry installed by the Gfx VM is detected (e.g., accessed or forked off) and translated into an HPA entry (e.g., the GPA data portion is translated to HPA, but the index, offset, or location from (offset, GPA data) 912 does not change). Block 1030 may include MC 115 detecting entries being added to page directory 266 and/or by detecting entries being written or entered into memory by Gfx VM 150 or otherwise (e.g., such as by another entity storing entries in main memory for a page directory). Block 1030 may also include MC 115 translating (offset, GPA data) 912 into (HPA data) 924 using 3-level walk 580 (or another GPA to HPA translation, such as single level remap 278), as described above for FIG. 9. The translation at block 1030 may be described as a DMA remap to translate data from GPAs into HPAs (e.g., such as using remap table 278).

Entry 910 and/or (offset, GPA data) 912 may be installed (e.g., accessed) by graphics VM 150 during boot-up or initialization of environment 100 or during loading or execution of an application of applications 132 or 142. Similarly, MC 115 may detect or sense (offset, GPA data) 912 being inserted in, created in or stored in memory for page directory 266, such as using software, firmware, logic, circuitry, traps, stops and/or appropriate devices or processes. Although block 1030 may include a translation using a 3-level walk and FIG. 9 shows 3-level walk 580, other appropriate GPA to HPA translations may be used (e.g., such as a single level walk, like table 278).

At block 1040 the HPA entry is stored into the shadow guest PPPD. Block 1040 may include (HPA data) 924 being stored in shadow guest PPPD 274 at the corresponding position in the shadow table, as described above for FIG. 9. Block 1040 and/or FIG. 9 may include storing an entry, such as to create or build a shadow table as described above with respect to table 274 of FIG. 6A or 6B.

According to some embodiments, environment 900 and/or process 1000 may include blocks for creating a shadow guest PPPD, but not for creating a single level DMA remap. Alternatively, some embodiments may include creating a single level DMA remap, but not creating a shadow guest PPPD (e.g., as described in FIGS. 6A, 6B, and/or 4, but not show in FIGS. 9-10). Also, storing a GPA entry converted by Gfx VM into shadow global GTT and/or shadow guest PPPD at blocks 820 and 1020 (e.g., writing GPA to non-shadow tables) is optional in some embodiments. Moreover, in some cases the non-shadow tables do not exist. The MC senses the attempted write to the table and indication of a successful write may be provided by the MC and/or virtually (e.g., non-shadow table is a virtual table that does indicate a successful write but does not store the data). In some case the write to the non-existing table may be a write to the MC.

A similar concept as that described for FIGS. 9-10 applies for MC 215 and controller 118 (e.g., environment 200) of FIGS. 1B and 6B. In such cases, MC 215 may include or be described as lookup circuitry, such as circuitry to perform this translation or conversion.

Figure 11:
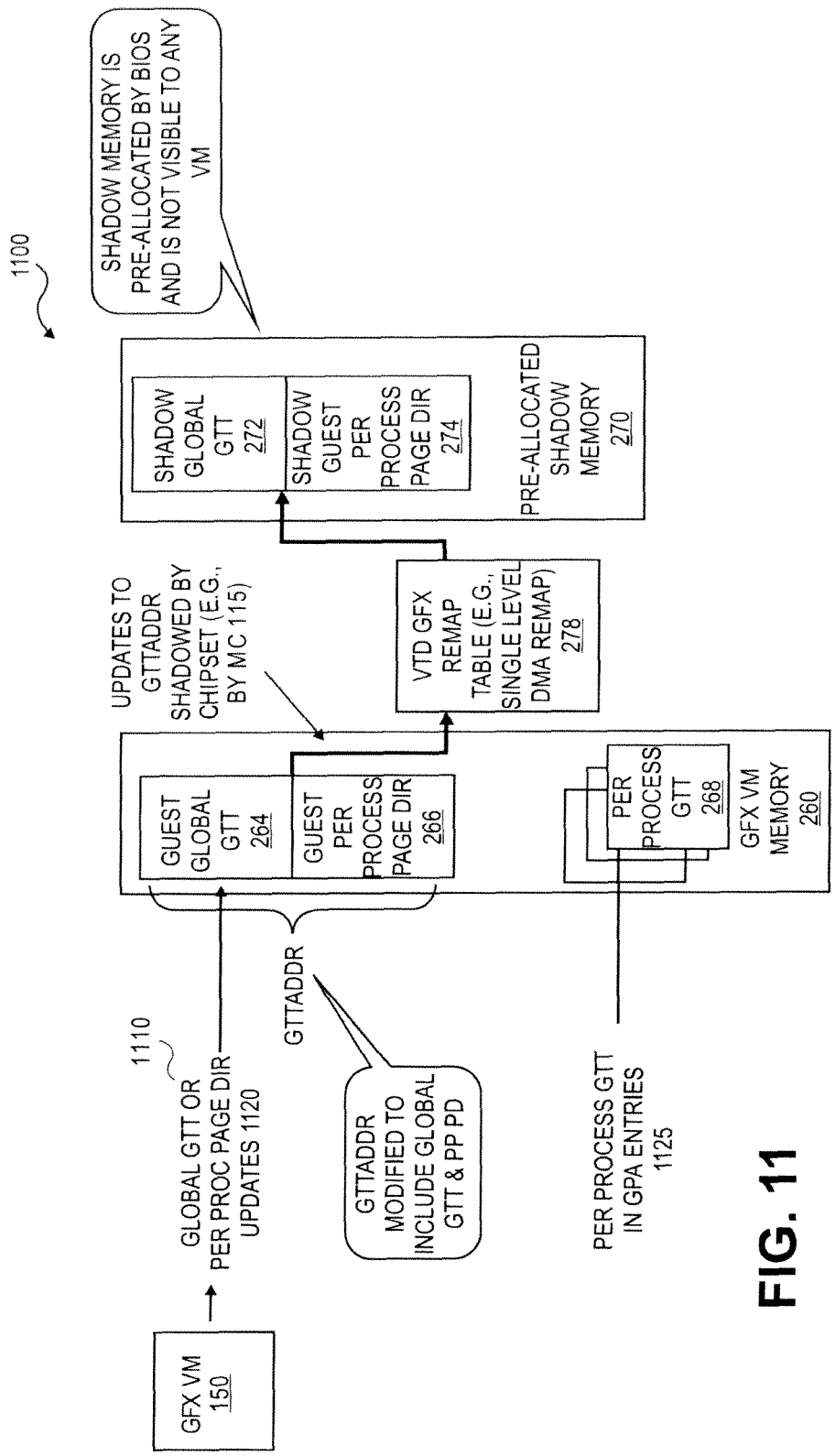
FIG. 11 is a block diagram of an environment for maintaining shadow tables.

FIG. 11 is a block diagram of an environment for maintaining or updating shadow tables. FIG. 11 shows environment 1100 including graphics VM 150, memory 260, and a shadow memory 270. Graphics VM 150 may create or produce Global GTT Update 1110 and/or Process Page Directory Update 1120. Updates 1110 and/or 1120 may be similar to (offset, GPA data) 712 and/or 912, respectively, except that Updates 1110 and 1120 may occur after boot-up or initialization of a computing system of environment 100. Updates 1110 and 1120 may also describe updating an entry that already exists in a table, at any time. Update 1110 and 1120 may be sensed, or detected by MC 115, such as when they are being sent to, written to, or otherwise used to update tables 264 or 266 in memory 260.

According to embodiments, MC 115 uses a single level remap to create shadow table updates or entries to be written to or entered into table 272 and/or 274 of memory 270. For example, a single-level remap may translate the GPA addresses to HPA addresses using a table such as single-level DMA Remap 278. Alternatively, in other embodiments, in response to the detection, MC 115 uses a multi-level walk 580 to create a shadow table update or entry to be written to or entered to table 272 and/or 274 in memory 270, according to some embodiment.

Similarly, VMM 120 may produce entries 1125 to be sent to or written to table 268 in memory 260. According to embodiments, the hardware may not shadow the Per Process GTT tables, so that they may remain in GPA. Hence, in some cases entries 1125 need to be translated using three-level walk 580 to create HPA addresses before accessing memory. This process may be similar to that described above with respect to creation of each of a GPA to HPA table for FIGS. 6A, 6B, and or 4.

A similar concept as that described for FIG. 11 applies for MC 215 and controller 118 (e.g., environment 200) of FIGS. 1B and 6B.

Figure 12:
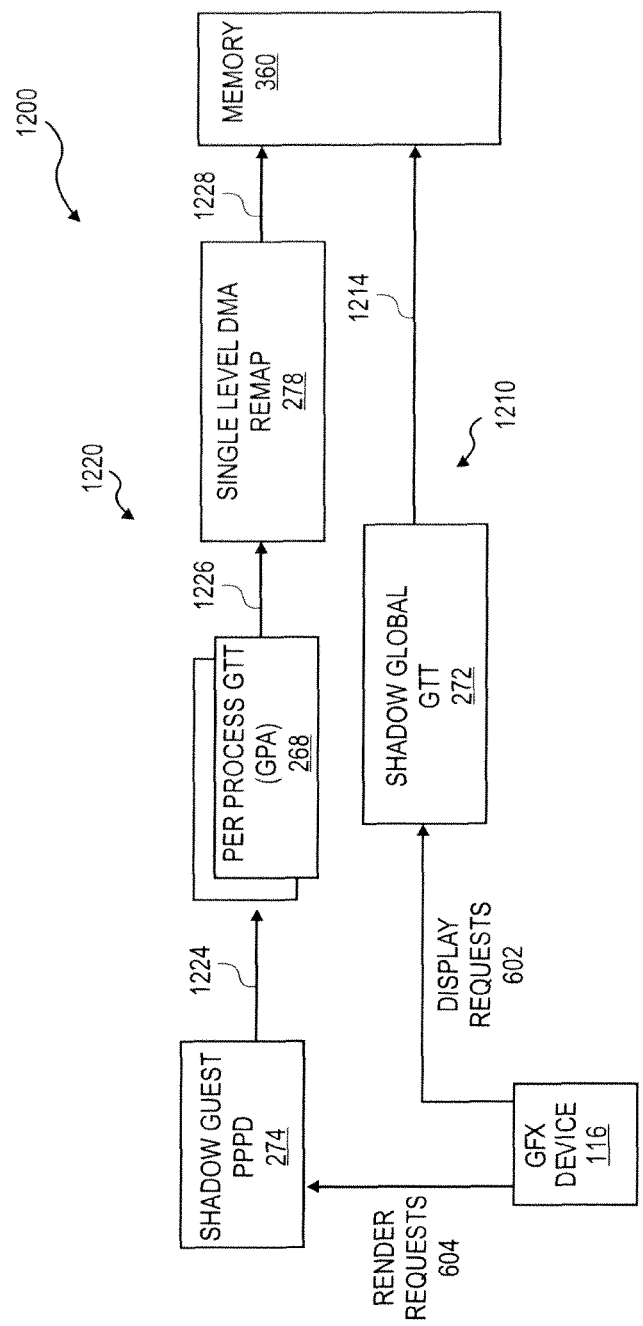
FIG. 12 is a block diagram illustrating graphics render and display data paths, in accordance with one embodiment.

FIG. 12 is a block diagram illustrating graphics render and display data paths, in accordance with one embodiment. FIG. 12 shows environment 1200 including path 1210, such as a display path, and path 1220, such as a render path. Path 1210 may be a path similar to path 410 of FIG. 5, except path 1210 uses table 272 in place of table 264 and walk 580. Likewise, path 1220 may be a render path similar to path 420 of FIG. 5, except path 1220 uses table 274 in place of directory 266 and walk 580, and may use remap 278 in place of walk 580. Environment 1200 includes a render engine (e.g., of graphics device 116) sending rendered requests 604 to Shadow-Guest PPPD 274. Requests 604 are translated by table 274 into translations 1224.

It can be appreciated that using table 274 to do the single-level translation, is much more efficient than using directory 266 and walk 580 of FIG. 3, 6 or 9. Translation at 1224 may correspond to HPA 624 of FIG. 5 or a request translated using (HPA data) 924 of FIG. 9, or an entry of table 274. Also, translations 1224 may correspond to translations 714 of FIG. 7. The translation using table 274 may be performed by MC 115 using memory 270, as shown in FIG. 6A or 6B. Translation at 1224 may be then be the lookup sent to Per Process GTT 268. At table 268, the lookup provides GPA 1226. GPA 1226 may correspond to GPA 626 of FIG. 5 or 924 of FIG. 9, or an entry of table 268. Translations 1226 is then sent to single-level DMA remap 278. GPA 1226 is translated by remap 278 into translation 1228. Translation 1228 may be or correspond to HPA 628 of FIG. 5, or a HPA translated by table 268 or 278. Translation of GPA 1226 into translation 1228 may be performed by MC 115 using a single-level DMA remap (e.g., such as remap 278) stored in memory 270, as shown in FIGS. 6A and 6B. Translations 1228 may be sent to memory 360, such as for data access FIG. 2.

It can be appreciated that the translation of GPA 1226 into translation 1228 using remap 278 is more efficient than the process described above with respect to translating GPA 626 into HPA 628 using walk 580 of FIG. 5 (e.g., remap 278 is a single-level or single look translation, while walk 580 is a three-level translation). Alternatively, in some embodiments, a remap or translation other than remap 278 may be used to translate GPA 1226 to an appropriate translation for memory 360. For example, three-level walk 580 may be used in place of remap 278.

Translation 1228 is then used to access data in (e.g., read or write graphics data into) memory 360, such as by addressing graphics data 370 or 374 at HPAs 362 as described with respect to FIG. 2.

Also, in environment 1200 a display engine (e.g., of graphics device 116) may send display request 602 to Shadow Global GTT 272. Table 272 may translate request 602 into translation 1214, such as describe for using table 272 at FIG. 3, 5 or 9. Translations 1214 may correspond to HPA 614 of FIG. 5, or (HPA data) 924 of FIG. 9. Also, translations 1214 may correspond to translations using (HPA data) 714 of FIG. 7. It can be appreciated that using table 272 to translate request 602 to translations 1214 may be more efficient and faster than using table 264 and walk 580, as described above with respect to FIG. 5. Translations 1214 may be translated from request 602 using table 272 stored in memory 270 by MC 115, as shown in FIG. 6A or 6B. Translations 1214 may be sent to memory 360, such as for data access FIG. 2.

Tables 272 and 274 may be architecturally invisible (e.g., not visible to, or not exposed to) VM (e.g., system 130 or 140, or applications 132 or 142), and/or the VMM (e.g., VMM 120). According to embodiments, table 278 may always be architecturally visible to (e.g., exposed to) the VMM (e.g., VMM 120). Also, tables 272, 274, and 278 may be visible to the hardware or chipsets, such as MC 115 or 215, device 116, and/or controller 118. A table, entry, data, or location in memory may be considered visible to a VM, VMM, circuit, OS and/or other entity if it is reported to, known to exist by, exposed to, accessible by, may be written to, may be read from, and/or otherwise may be manipulated by that entity. A table, entry, data, or location in memory may be considered invisible to, hidden from, and/or stolen from a VM, VMM, circuit, OS and/or other entity if it is not reported to, not known to exist by, not exposed to, not accessible by, may not be written to, may not be read from, and/or otherwise may be not manipulated by that entity.

MC 115 may produce the translations using table 272, 274, and/or remap 278 transparently to the VM's or VMM. MC 115 or 215 may also create or update entries to table 272, 274, and/or 278 transparently to the VM's or VMM. The creation, updating, and use of table 272, 274 may be performed transparently, by MC 115 or 215 detecting or sensing writes to the GTT ADDR (e.g., Global Translation Table Address) aperture, and forking off a shadow table entry, update, or use. Forking off a use may involve using table 272, 274, and/or 278. Forking off an entry or update may involve sending or writing an entry or update to table 272, 274, and/or 278. Moreover, translating an entry or data, looking up an entry or data, or otherwise using table 272, 274 and/or 278 or display or render graphics data may include indexing (such as using a base and/or offset address) an entry or data in table 272, 274 and/or 278 at a location or address that is the same as the address or location the entry is or would be at in corresponding table 264, 266, and/or 268.

A similar concept as that described for FIG. 12 applies for MC 215 and controller 118 (e.g., environment 200) of FIGS. 1B and 6B.

Figure 13:
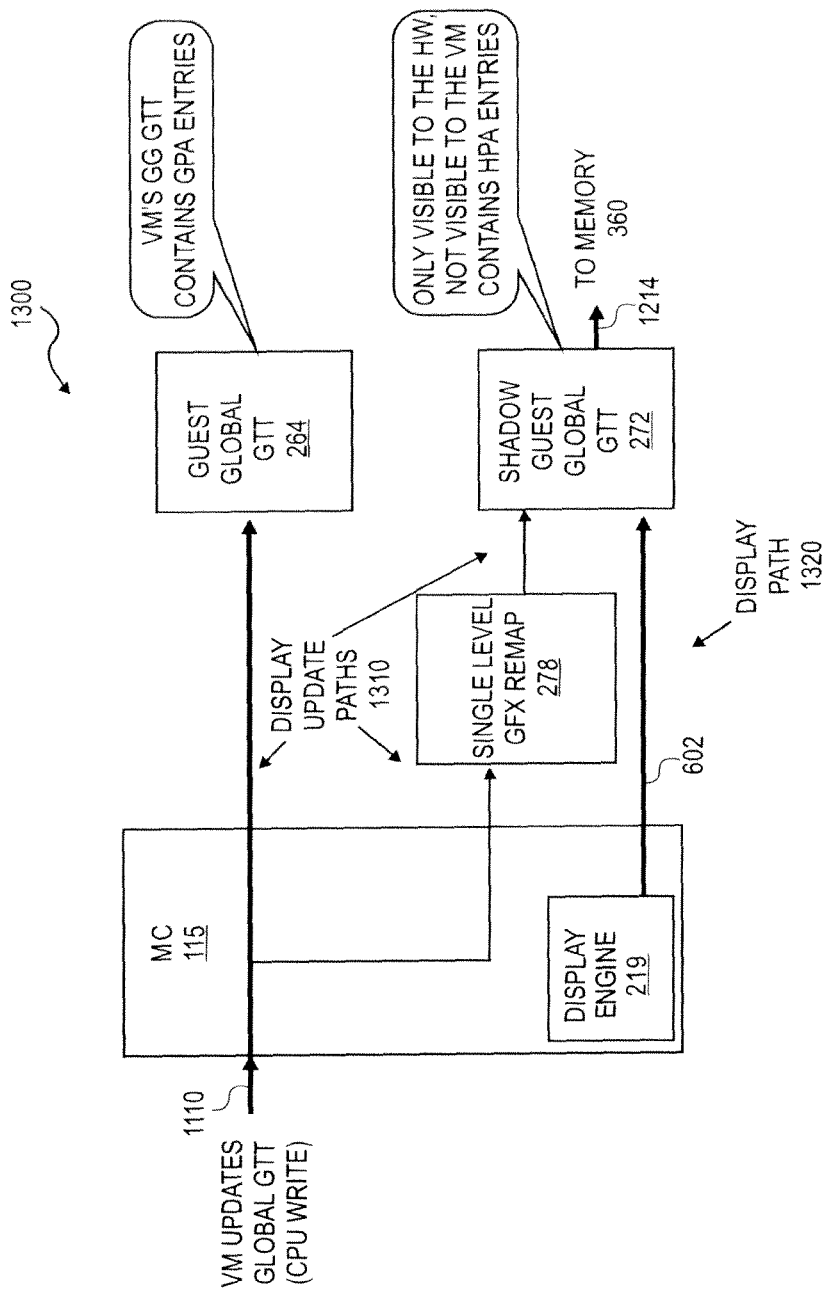
FIG. 13 is a block diagram illustrating a graphics display path update and display path, in accordance with one embodiment.

FIG. 13 is a block diagram illustrating a graphics display path update and display path, in accordance with one embodiment. FIG. 13 shows environment 1300, including display update path 1310 and display path 1320. Paths 1310 may correspond to portions of environment 1100 as described with respect to FIG. 11. Paths 1310 are shown including Global GTT update 1110 being forked by MC 115 to send an entry to guest Global GTT 264 and another entry to single-level remap 278. From single-level remap 278, the update is sent to shadow guest Global GTT 272, such as to update an entry of table 272.

Path 1320 may correspond to the description for path 1210 of FIG. 12, and may provide the same functionality as path 410 of FIG. 3. Path 1320 is shown including display engine 219 of MC 115 sending request 602 to table 272. Table 272 translates the request and sends it to memory 360 as translation 1214.

A similar concept as that described for FIG. 13 applies for MC 215 and controller 118 (e.g., environment 200) of FIGS. 1B and 6B.

Figure 14:
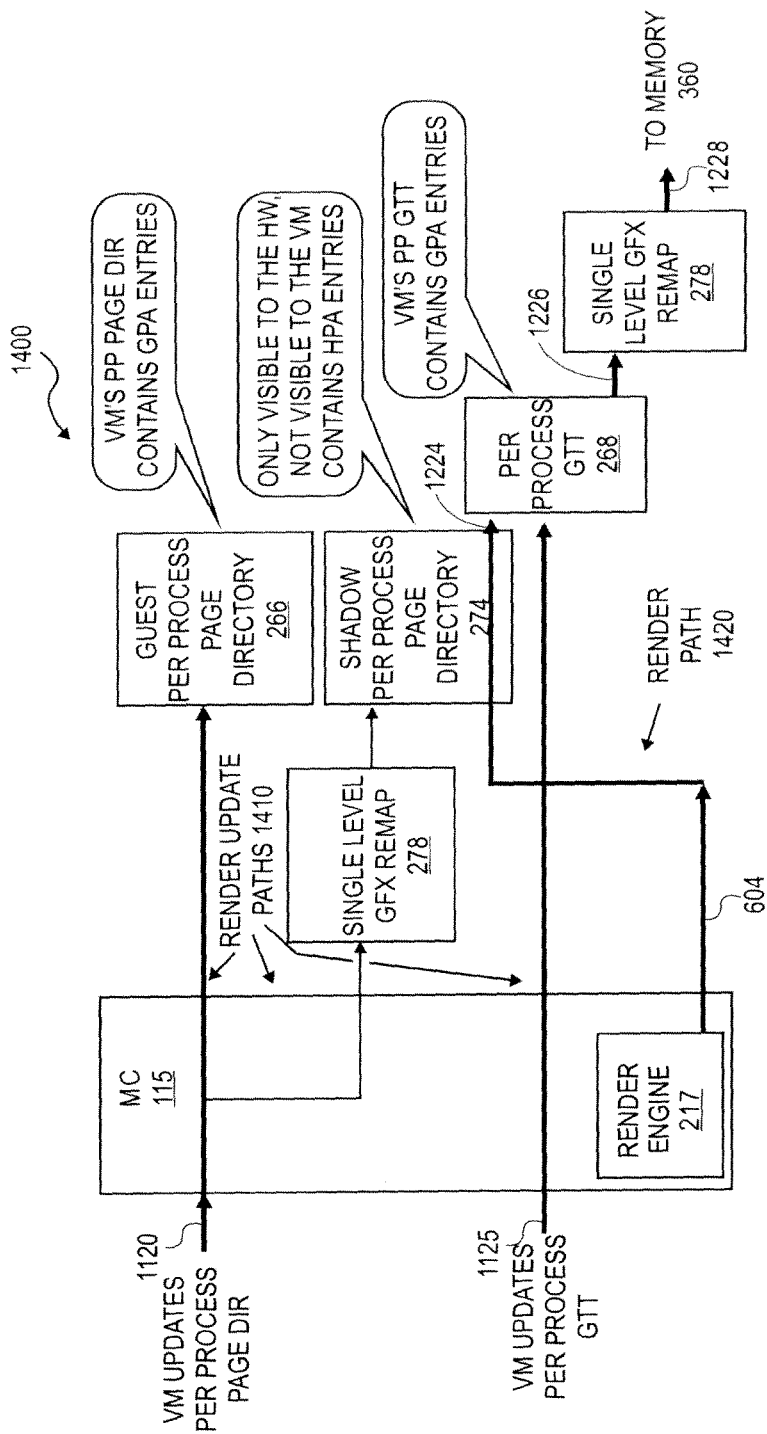
FIG. 14 is a block diagram illustrating a graphics render path update and render path, in accordance with one embodiment.

Also, FIG. 14 is a block diagram illustrating a graphics render path update and render path, in accordance with one embodiment. FIG. 14 shows environment 1400 including render update paths 1410 and render path 1420. Paths 1410 may correspond to portions of environment 1100 of FIG. 11. Paths 1410 include Per Process page directory update 1120 entering MC 115 which forks the update into one update for guest Per Process page directory 266, and another update sent to single-level remap 278. From single-level remap 278 the translation of the update is sent to shadow Per Process page directory 274. Update 1120 may correspond to update (offset, GPA data) 912 of FIG. 9.

Paths 1410 also include Per Process GTT updates 1125 received by MC 115 and forwarded to Per Process GTT 268. Update 1125 may be an update similar to an update table 278 as described for FIGS. 6A, 6B, and 4.

Render path 1420 is shown including render engine 217 of MC 115 sending render request 604 to table 274 which sends translation 1224 to table 268 which sends translation 1226 to table 278 which sends translation 1228 to memory 360. Path 1428 may correspond to path 1220 of FIG. 12.

A similar concept as that described for FIG. 14 applies for MC 215 and controller 118 (e.g., environment 200) of FIGS. 1B and 6B.

Graphics VM (e.g., graphics VM 150), VMM 120, MC 115, and/or graphics devices (e.g., device 116 and/or controller 118) may include appropriate electronic or computer hardware and software for performing functions as described above with respect to FIGS. 1-14. Also, it should be appreciated that more or fewer devices and/or processes may be incorporated into the devices and methods illustrated in FIGS. 1-14 without departing from the scope of the invention and that no particular order is implied by the arrangement of blocks shown and described herein. It further will be appreciated that the methods and devices described in conjunction with FIGS. 1-14 may be embodied in machine-executable instructions (e.g. software). The instructions can be used to cause a general-purpose or special-purpose processor that is programmed with the instructions to perform the operations and processes described. Alternatively, the operations and processes might be performed by specific hardware components that contain hardwired logic for performing the operations, or by any combination of programmed computer components and custom hardware components. The methods may be provided as a computer program product that may include a machine-readable medium having stored thereon instructions that may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. In some cases, environments described herein may be implemented on a PC or, alternatively on a computer server (e.g., a server to serve one or more client computers, such as with data to be displayed).

In the foregoing specification, specific embodiments are described. However, various modifications and changes may be made thereto without departing from the broader spirit and scope of embodiments as set forth in the claims. The specification and drawings are, accordingly, to be regarded in an illustrative rather than a restrictive sense.

The invention claimed is:

1. An apparatus comprising:
a memory management unit to provide support for translating guest addresses associated with a graphics device to host physical addresses for a virtualized graphics execution environment comprising a host on which one or more guests are executed to perform graphics operations, wherein a guest address comprises at least three portions for page table look-up, and wherein each of the at least three portions of the guest address is used for look-up of one page table;
translation table management circuitry of the memory management unit to access a plurality of address translation table entries,
the address translation table entries to provide a mapping of guest addresses associated with the graphics device to host physical addresses to access physical locations in a system memory; and
the memory management unit to create shadow address translation table entries, each shadow address translation table entry corresponding to at least one of the plurality of address translation table entries, and to update a shadow address translation table entry responsive to detecting a guest update to a corresponding one of the address translation table entries.

2. A system comprising:
a system memory to store program code and data;
a central processing unit to execute the program code and process the data;
a memory management unit to provide support for translating guest addresses associated with a graphics device to host physical addresses for a virtualized graphics execution environment comprising a host on which one or more guests are executed to perform graphics operations, wherein a guest address comprises at least three portions for page table look-up, and wherein each of the at least three portions of the guest address is used for look-up of one page table;
translation table management circuitry of the memory management unit to access a plurality of address translation table entries, the address translation table entries to provide a mapping of guest addresses associated with the graphics device to host physical addresses to access physical locations in a system memory; and the memory management unit to create shadow address translation table entries, each shadow address translation table entry corresponding to at least one of the plurality of address translation table entries, and to update a shadow address translation table entry responsive to detecting a guest update to a corresponding one of the address translation table entries.

3. A method comprising:

providing support for translating guest addresses associated with a graphics device to host physical addresses for a virtualized graphics execution environment comprising a host on which one or more guests are executed to perform graphics operations, wherein a guest address comprises at least three portions for page table look-up, and wherein each of the at least three portions of the guest address is used for look-up of one page table;

accessing a plurality of address translation table entries, the address translation table entries to provide a mapping of guest addresses associated with the graphics device to host physical addresses to access physical locations in a system memory; and creating shadow address translation table entries, each shadow address translation table entry corresponding to at least one of the plurality of address translation table entries, and updating a shadow address translation table entry responsive to detecting a guest update to a corresponding one of the address translation table entries.

4. An apparatus comprising:

memory management means to provide support for translating guest addresses associated with a graphics device to host physical addresses for a virtualized graphics execution environment comprising a host on which one or more guests are executed to perform graphics operations, wherein a guest address comprises at least three portions for page table look-up, and wherein each of the at least three portions of the guest address is used for look-up of one page table;

translation table management means to access a plurality of address translation table entries, the address translation table entries to provide a mapping of guest addresses associated with the graphics device to host physical addresses to access physical locations in a system memory; and shadow address translation table means to create shadow address translation table entries, each shadow address translation table entry corresponding to at least one of the plurality of address translation table entries, and to update a shadow address translation table entry responsive to detecting a guest update to a corresponding one of the address translation table entries.

* * * * *